US010243240B2

(12) United States Patent
Young et al.

(10) Patent No.: US 10,243,240 B2
(45) Date of Patent: Mar. 26, 2019

(54) ELECTROLYTES AND METAL HYDRIDE BATTERIES

(71) Applicant: BASF Corporation, Florham Park, NJ (US)

(72) Inventors: Kwo Young, Troy, MI (US); Jean Nei, Southgate, MI (US); Diana Wong, Sterling Heights, MI (US); Wentao Li, Solon, OH (US); Lixin Wang, Ypsilanti, MI (US)

(73) Assignee: BASF Corporation, Florham Park, NJ (US)

( * ) Notice: Subject to any disclaimer, the term of this patent is extended or adjusted under 35 U.S.C. 154(b) by 636 days.

(21) Appl. No.: 14/540,537

(22) Filed: Nov. 13, 2014

(65) Prior Publication Data

US 2016/0141726 A1    May 19, 2016

(51) Int. Cl.
*H01M 10/34* (2006.01)
*H01M 4/38* (2006.01)
*H01M 10/26* (2006.01)
*H01M 10/24* (2006.01)
*H01M 10/28* (2006.01)

(52) U.S. Cl.
CPC ......... *H01M 10/26* (2013.01); *H01M 10/24* (2013.01); *H01M 10/28* (2013.01); *H01M 10/345* (2013.01); *H01M 2300/0014* (2013.01); *H01M 2300/0028* (2013.01); *H01M 2300/0037* (2013.01)

(58) Field of Classification Search
CPC .... H01M 10/345; H01M 10/24; H01M 10/26; H01M 10/28; H01M 2300/0014; H01M 2300/0037; H01M 10/0567; H01M 10/0568; H01M 10/0569; H01M 2300/0028; H01M 2300/0034; H01M 2/02; H01M 2/0202; H01M 2300/0017; H01M 2300/0002; H01M 2300/0025; H01M 2300/0031; H01M 2300/004; H01M 2300/0042; H01M 2300/0045; H01M 2300/0048; H01M 2300/0051; H01M 2300/0054; H01M 2300/0057; H01M 2300/006; H01M 2300/0062; H01M 4/383; H01M 4/242; H01M 8/04216; C01B 3/0078; C01B 3/0031; C01B 3/0042; C01B 3/0084; C01B 3/0036; C01B 3/0068; C01B 3/001; C01B 3/0021; C01B 3/0057; Y02E 60/327; Y02E 60/321; Y02E 60/324; Y02E 60/124; Y02E 60/325

See application file for complete search history.

(56) References Cited

U.S. PATENT DOCUMENTS

| 5,304,432 | A |  | 4/1994 | Townsend |
| 5,455,125 | A |  | 10/1995 | Matsumoto et al. |
| 5,541,019 | A | * | 7/1996 | Anani ................. H01M 10/347 429/222 |
| 5,585,208 | A |  | 12/1996 | Lian et al. |
| 6,045,948 | A |  | 4/2000 | Wang et al. |
| 6,198,622 | B1 |  | 3/2001 | Nitta et al. |
| 6,871,585 | B2 |  | 3/2005 | Sato et al. |
| 7,396,379 | B2 |  | 7/2008 | Fetcenko et al. |
| 7,579,117 | B1 |  | 8/2009 | Beard |
| 2004/0023121 | A1 |  | 2/2004 | Nakamura et al. |
| 2005/0095478 | A1 |  | 5/2005 | Higley |
| 2006/0046150 | A1 |  | 3/2006 | Kashida et al. |
| 2007/0212615 | A1 |  | 9/2007 | Jost et al. |
| 2008/0286652 | A1 |  | 11/2008 | Nazri et al. |

(Continued)

FOREIGN PATENT DOCUMENTS

| CN | 101752628 | * | 6/2010 |
| EP | 0872904 A2 |  | 10/1998 |

(Continued)

OTHER PUBLICATIONS

Journal of Power Sources 263 (2014) 304-309, Karwowska, et al.
Polymers 2011, 3, 1600-1606, Chiku, et al.
Journal of the Electrochemical Society, 146 (1) 20-26 (1999), Vassal, et al.
Electrochimica Acta 48 (2003) 1499-1503, Iwakura, et al.
Department of Material Science, Faculty of Engineering, Tottori University, Solid-State Metal Hydride Secondary Batteries Using Heteropolyacid Hydrate as an Electrolyte, Sakaguchi, et al.

(Continued)

*Primary Examiner* — Basia A Ridley
*Assistant Examiner* — Heng M. Chan
(74) *Attorney, Agent, or Firm* — Dinsmore & Shohl LLP

(57) ABSTRACT

A metal hydride battery comprising at least one negative electrode, at least one positive electrode, a casing having said electrodes positioned therein and an electrolyte composition, where the electrolyte composition comprises an ionic compound selected from the group consisting of protic acids, protic ammonium compounds, protic oxonium compounds, aprotic ammonium compounds, aprotic oxonium compounds, aprotic phosphonium compounds and alkali or alkali earth metal salts; or where the electrolyte composition comprises an ionic compound selected from the group consisting of alkali or alkali earth metal hydroxides and alkali or alkali earth metal alkoxides and an organic solvent; or where the electrolyte composition comprises an alkali metal hydroxide, water and one or more further components selected from the group consisting of organic solvents, further ionic compounds and additives; or where the electrolyte composition comprises an ionic compound selected from the group consisting of carboxylate compounds and carboxylic acids. Ionic compounds include ionic liquids and salts. Metal hydride batteries comprising certain electrolyte compositions have a nominal open-circuit voltage of from about 1.5 V to about 5.0 V.

21 Claims, No Drawings

(56) References Cited

U.S. PATENT DOCUMENTS

| | | | | |
|---|---|---|---|---|
| 2009/0134842 | A1* | 5/2009 | Joshi | H01M 2/1646 320/127 |
| 2009/0246625 | A1* | 10/2009 | Lu | H01M 4/133 429/207 |
| 2011/0045359 | A1 | 2/2011 | Schmidt et al. | |
| 2012/0214057 | A1 | 8/2012 | Wietelmann | |
| 2012/0231337 | A1* | 9/2012 | Miyata | C08J 3/05 429/217 |
| 2013/0040195 | A1* | 2/2013 | Hosoe | H01G 11/06 429/211 |
| 2013/0084474 | A1 | 4/2013 | Mills | |
| 2013/0089793 | A1 | 4/2013 | Gering et al. | |
| 2013/0183546 | A1 | 7/2013 | Joshi et al. | |
| 2013/0230768 | A1* | 9/2013 | Sakamoto | H01M 4/621 429/188 |
| 2013/0302704 | A1 | 11/2013 | Visco et al. | |
| 2014/0087214 | A1* | 3/2014 | Amatucci | H01G 11/62 429/11 |
| 2014/0168855 | A1 | 6/2014 | Galiano et al. | |
| 2014/0205909 | A1 | 7/2014 | Yonehara et al. | |
| 2015/0010833 | A1 | 1/2015 | Amendola et al. | |
| 2015/0372342 | A1* | 12/2015 | Zidan | H01M 10/052 320/128 |

FOREIGN PATENT DOCUMENTS

| | | |
|---|---|---|
| EP | 1100141 A1 | 5/2001 |
| WO | 2012034042 A2 | 3/2012 |
| WO | WO2013027767 | 2/2013 |

OTHER PUBLICATIONS

Journal of Power Sources 124 (2003) p. 559-563, Hatakeyama, et al., "Solid-state metal-hydride batteries using heteropolyacid hydrate as an electrolyte".

International Search Report dated Feb. 19, 2016.

Jin-Li Qiao, et al. Electrochimica Acta 47 (2002) 3441-3446, "Acetic acid-doped poly(ethylene oxide)-modified poly (methacrylate): a new proton conducting polymeric gel electrolyte".

Sigma-Aldrich, "ChemFiles Enabling Technologies Ionic Liquids", vol. 5, No. 6, 2005.

Carlin, R.T., et al., J. Electrochem. Soc., vol. 141, No. 7, Jul. 1994, L73-L76.

Machine Translation JP2013051065.

Sigma-Aldrich, Sulfuric Acid Product Information, 2013, pp. 1-2.

Kanto Reagent, Ionic Liquid, pp. 1-4.

* cited by examiner

ELECTROLYTES AND METAL HYDRIDE BATTERIES

GOVERNMENT SUPPORT STATEMENT

This invention was made with government support under DE-AR0000386 awarded by Advanced Research Projects Agency-Energy. The government has certain rights in the invention.

BACKGROUND OF THE INVENTION

The present invention is aimed at metal hydride (MH) batteries containing certain electrolyte compositions.

Much progress has been made in optimizing the electrochemical performance and cycle life of metal hydride batteries through optimization of the electrodes. The electrolyte of metal hydride batteries is presently 30% by weight aqueous KOH. The aqueous KOH electrolyte is corrosive to some electrode materials. Aqueous electrolyte is also limited by the hydrogen and oxygen evolution potential of water. The present invention is focused on improved electrolytes.

SUMMARY OF THE INVENTION

Disclosed is a metal hydride battery (cell) comprising at least one negative electrode, at least one positive electrode, a casing having said electrodes positioned therein and an electrolyte composition, where the electrolyte composition comprises one or more ionic compounds selected from the group consisting of protic acids, protic ammonium compounds, protic oxonium compounds, aprotic ammonium compounds, aprotic oxonium compounds, aprotic phosphonium compounds and alkali or alkali earth metal salts.

Also disclosed is a metal hydride battery comprising at least one negative electrode, at least one positive electrode, a casing having said electrodes positioned therein and an electrolyte composition, where the electrolyte composition comprises one or more ionic compounds selected from the group consisting of alkali or alkali earth metal hydroxides and alkoxides and an organic solvent.

Also disclosed is a metal hydride battery comprising at least one negative electrode, at least one positive electrode, a casing having said electrodes positioned therein and an electrolyte composition, where the electrolyte composition comprises one or more ionic compounds selected from the group consisting of alkali metal hydroxides, water and one or more further components selected from the group consisting of organic solvents, further ionic compounds and additives.

Also disclosed is a metal hydride battery comprising at least one negative electrode, at least one positive electrode, a casing having said electrodes positioned therein and an electrolyte composition, where the electrolyte composition comprises one or more ionic compounds selected from the group consisting of carboxylate compounds and carboxylic acids.

Also disclosed is a metal hydride battery comprising at least one negative electrode, at least one positive electrode, a casing having said electrodes positioned therein and an electrolyte composition, where the battery exhibits a nominal open-circuit voltage of from about 1.5 to about 5.0 V.

Also subject of the invention is a metal hydride battery comprising at least one negative electrode, at least one positive electrode, a casing having said electrodes positioned therein and an electrolyte composition, where the electrolyte composition has a pH of less than or equal to about 7.

Also subject of the present invention is a metal hydride battery comprising at least one negative electrode, at least one positive electrode, a casing having said electrodes positioned therein and an electrolyte composition, where the half cell charge/discharge electrochemical reaction at the anode upon application of an electrical potential across the cell is $$M + H^+ + e^- \rightleftharpoons MH.$$

DETAILED DISCLOSURE

The electrolyte composition is useful in a metal hydride battery (metal hydride cell). A metal hydride battery comprises at least one negative electrode, at least one positive electrode, a casing having said electrodes positioned therein and an electrolyte composition in contact with the electrodes.

The active material of the negative electrode (anode material) comprises an $AB_x$ type alloy capable of storing hydrogen where x is from about 0.5 to about 5. A is a hydride forming element and B is a weak or non-hydride forming element. The alloys are capable of reversibly absorbing and desorbing hydrogen.

The ABx type alloys are for example of the categories (with simple examples): AB (HfNi, TiFe, TiNi), $AB_2$ ($Mn_2Zr$, $TiFe_2$), $A_2B$ ($Hf_2Fe$, $Mg_2Ni$), $AB_3$ ($NdCo_3$, $GdFe_3$), $A_2B_7$ ($Pr_2Ni_7$, $Ce_2Co_7$) and $AB_5$ ($LaNi_5$, $CeNi_5$).

For example, the anode active material comprises Zr, Mn, V, Fe and Ni; Zr, Mn, V, Co and Ni; Ti, V and Ni; La and Ni; Ti, Zr, Ni, Cr and one or more elements selected from the group consisting of Al, Si, V, Mn, Fe, Co, Cu, Nb, Ag and Pd; Zr, Mo and Ni; or a lanthanide metal and at least one metals selected from Ni and Co.

The anode material may comprise a disordered multi-component material comprising one or more host elements selected from the group consisting of V, Zr, Nb, La, Si, Ca, Sc, Mg, Ti and Y and one or more modifier elements selected from the group consisting of Cu, Mn, C, Fe, Ni, Al, Co, Mo, W, Ti, Li and Re. The host elements are in general hydride formers. For instance, the host matrix is one or more of Ti, Mg and V and the modifier includes one or more of Ni, Cu, Fe and Al. Such disordered materials are taught in U.S. Pat. No. 4,623,597.

The anode material may comprise a multi-component, multi-phase alloy comprising V, Ti, Zr and Ni or V, Ti, Zr, Ni and Cr and one or more modifying elements selected from the group consisting of Al, Mn, Mo, Cu, W, Fe and Co. Such multi-phase materials are taught in U.S. Pat. No. 5,096,667.

The anode material may comprise disordered material comprising (base alloy)$_a$Co$_b$Mn$_c$Fe$_d$Sn$_e$ where base alloy comprises from 0.1 to 60 atomic percent (at %) Ti, 0.1 to 40 at % Zr, 0 to 60 at % V, 0.1 to 57 at % Ni and 0 to 56 at % Cr; b is 0 to 7.5 at %, c is 13 to 17 at %, d is 0 to 3.5 at %, e is 0 to 1.5 at % where a, b, c, d and e equal 100 at %. Such alloys are disclosed in U.S. Pat. No. 5,536,591.

The anode active material is for instance a $LaNi_5$ type alloy, a modified $LaNi_5$ type alloy, a TiNi type alloy or a modified TiNi type alloy. For example, the anode active material comprises one or more elements selected from the group consisting of Ti, V and Zr and one or more elements selected from the group consisting of Ni, Cr, Co, Mn, Mo, Nb, Fe, Al, Mg, Cu, Sn, Ag, Zn and Pd; or the anode active material comprises one or more elements selected from the group consisting of Sc, Y, La, Ce, Pr, Nd, Sm and Mm and one or more elements selected from the group consisting of Ni, Cr, Co, Mn, Fe, Cu, Sn, Al, Si, B, Mo, V, Nb, Ta, Zn, Zr, Ti, Hf and W. Such alloys may further include one or more glass forming elements selected from the group consisting of Al, B, C, Si, P, S, Bi, In and Sb. Such materials advantageously are disordered, multi-component materials having a density of hydrogen storage sites of greater than 1.2 E23/cc or greater than 1.5 E23/cc. Such material are disclosed in U.S. Pat. No. 5,840,440.

The anode material may comprise a modified Ti—V—Zr—Ni—Mn—Cr alloy comprising (base alloy)$_a$Co$_b$Fe$_c$Al$_d$Sn$_e$, where base alloy comprises from 0.1 to 60 at % Ti, 0.1 to 40 at % Zr, 0 to 60 at % V, 0.1 to 57 at % Ni, 5 to 22 at % Mn and 0 to 56 at % Cr, b is 0.1 to 10 at %, c is 0 to 3.5 at %, d is 0.1 to 10 at %, e is 0.1 to 3 at %. Suitable materials are taught in U.S. Pat. No. 6,270,719.

Suitable anode materials may comprise AB$_2$ type alloys, such as a modified TiMn$_2$ alloy comprising 2 to 5 at % Zr, 26 to 33 at % Ti, 7 to 13 at % V, 8 to 20 at % Cr, 36 to 42 at % Mn and one or more of 1 to 6 at % Ni, 2 to 6 at % Fe and 0.1 to 2 at % Al. The alloys may further contain up to 1 at % Mm. For instance Zr$_{3.63}$Ti$_{29.8}$V$_{8.82}$Cr$_{9.85}$Mn$_{39.5}$Ni$_{2.0}$Fe$_{5.0}$Al$_{1.0}$Mm$_{0.4}$; Zr$_{3.6}$Ti$_{29.0}$V$_{8.9}$Cr$_{10.1}$Mn$_{40.1}$Ni$_{2.0}$Fe$_{5.1}$Al$_{1.2}$; Zr$_{3.6}$Ti$_{28.3}$V$_{8.8}$Cr$_{10.0}$Mn$_{40.7}$Ni$_{1.9}$Fe$_{5.0.1}$Al$_{1.6}$ and Zr$_1$Ti$_{33}$V12.$_{54}$Cr$_{15}$Mn$_{36}$Fe$_{2.25}$Al$_{0.21}$. Such alloys are disclosed in U.S. Pat. No. 6,536,487.

Suitable anode materials may comprise alloys where A$_5$B$_{19}$ type structures are 40 at % or more of the alloy of formula La$_a$R$_{i-a-b}$Mg$_b$Ni$_{c-d-e}$ where 0≤a 0.5≤at %, 0.1≤b≤0.2 at %, 3.7≤c≤3.9 at %, 0.1≤d≤0.3 and 0≤d≤0.2. These alloys are taught in U.S. Pat. No. 7,829,220.

The anode material may comprise hydrogen-absorbing alloy particles containing at least Ni and a rare earth. The particles may have a surface layer and an interior where the surface layer has a nickel content greater than that of the interior and nickel particles having a size of from 10 nm to 50 nm are present in the surface layer. The material may comprise an alloy Ln$_{i-x}$Mg$_x$Ni$_{a-b-c}$Al$_b$Z$_c$, where Ln is one or more rare earth elements, Z is one or more of Zr, V, Bn, Ta, Cr, Mo, Mn, Fe, Co, Ga, Zn, Sn, In, Cu, Si, P and B, 0.05≤x≤0.3 at %, 2.8≤a≤3.9 at %, 0.05≤b≤0.25 at % and 0.01≤c≤0.25. These materials are taught for example in U.S. Pat. No. 8,053,114.

The anode material may comprise a crystalline structure having a multiple phases containing at least an A$_2$B$_7$ type structure and a A$_5$B$_{19}$ type structure and a surface layer having a nickel content greater than that of the bulk. The alloys may be of formula Ln$_{i-x}$Mg$_x$Ni$_{y-a-b}$Al$_a$M$_b$, where Ln is one or more rare earths including Y, M is one or more of Co, Mn and Zn, where 0.1≤x≤0.2 at %, 3.5≤y≤3.9 at %, 0.1≤a≤0.3 at % and 0≤b≤0.2. Such materials are disclosed in U.S. Pat. No. 8,124,281.

The anode material may comprise a hydrogen storage alloy of formula Ln$_{i-x}$Mg$_x$(Ni$_{i-y}$T$_y$)$_z$ where Ln is one or more of lanthanide elements, Ca, Sr, Sc, Y, Ti, Zr and Hf, T is one or more elements selected from V, Nb, Ta, Cr, Mo, Mn, Fe, Co, Al, Ga, Zn, Sn, In, Cu, Si, P and B and where 0≤x≤1 at %, 0≤y≤0.5 at %, and 2.5≤z≤4.5 at %. Suitable alloys are taught in U.S. Pat. No. 8,257,862.

The anode material may comprise La, Nd, Mg, Ni and Al; La, Nd, Mg, Ni, Al and Co; La, Pr, Nd, Mg, Ni and Al or La, Ce, Pr, Nd, Ni, Al, Co and Mn as taught in U.S. Pat. No. 8,409,753. The alloys are prepared by mixing the elements, heating in a high frequency induction furnace under argon to melt and cooling to form ingots.

The anode material may comprise a multi-phase alloy comprising an AB$_2$ type main phase and a second phase. The material is modified with a modifier element. For instance, the alloy comprises Ti, Zr, B, Ni and a modifier. The modifier may be a light rare earth such as Y. The alloy may be of formula Ti$_A$Zr$_{B-X}$Y$_X$V$_C$Ni$_D$M$_E$ where A, B, C and D are each greater than 0 and less than or equal to 50 at %, X is greater than 0 and less than or equal to 4 at %, M is one or more metals selected from Co, Cr, Sn, Al and Mn and E is from 0 to 30 at %. These materials are taught in U.S. Pub. No. 2013/0277607.

The anode material may comprise a modified A$_2$B$_7$ type hydrogen storage alloy. For instance an A$_x$B$_y$ alloy where A includes at least one rare earth element and also includes Mg; B includes at least Ni and the atomic ratio X to Y is from 1:2 to 1:5, for instance 1:3 to 1:4. The alloy may be modified by one or more elements selected from the group consisting of B, Co, Cu, Fe, Cr and Mn. The atomic ratio of Ni to modifier(s) may be from 50:1 to 200:1. The rare earths include La, Ce, Nd, Pr and Mm. The atomic ratio of rare earths to Mg may be from 5:1 to 6:1. The B elements may further include Al where the atomic ratio of Ni to Al may be from 30:1 to 40:1. The surface of the alloy may comprise catalytic metallic regions supported in a porous oxide support matrix. The catalytic metallic regions may be Ni or Ni alloy.

The anode material may be an ABx high capacity hydrogen storage alloy where x is from about 0.5 to about 5 and which has a discharge capacity of ≥400 mAh/g, ≥425 mAh/g, ≥450 mAh/g or ≥475 mAh/g.

The anode material is for instance a high capacity MH alloy containing magnesium (Mg), for example an AB, AB$_2$ or A$_2$B type alloy containing Mg and Ni. For instance, present anode materials are MgNi, MgNi$_2$ or Mg$_2$Ni. Such Mg and Ni containing alloys may be modified by one or more elements selected from the group consisting of rare earth elements and transition metals. For instance, the anode materials containing Mg and Ni may be modified by one or more elements selected from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, Nb, Sc and Ca.

For instance, suitable anode materials comprise Mg and Ni and optionally one or more elements selected from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, Nb, Sc and Ca.

Mm is "mischmetal". Mischmetal is a mixture of rare earth elements. For instance, Mm is a mixture containing La, Nd and Pr, for instance containing Ce, La, Nd and Pr.

Magnesium-containing MH alloys are particularly susceptible to corrosion in a 30 weight percent (wt %) KOH electrolyte.

For example, suitable MH alloys include MgNi, Mg$_{0.8}$Ti$_{0.2}$Ni, Mg$_{0.7}$Ti$_{0.3}$Ni, Mg$_{0.9}$Ti$_{0.1}$Ni, Mg$_{0.8}$Zr$_{0.2}$Ni, Mg$_{0.7}$Ti$_{0.225}$La$_{0.075}$Ni, Mg$_{0.8}$Al$_{0.2}$Ni, Mg$_{0.9}$Ti$_{0.1}$Ni, Mg$_{0.9}$Ti$_{0.1}$NiAl$_{0.05}$, Mg$_{0.08}$Pd$_{0.2}$Ni, Mg$_{0.09}$Ti$_{0.1}$NiAl$_{0.05}$, Mg$_{0.09}$Ti$_{0.1}$NiAl$_{0.05}$Pd$_{0.1}$, Mg$_{50}$Ni$_{45}$Pd$_5$, Mg$_{0.85}$Ti$_{0.15}$Ni$_{1.0}$, Mg$_{0.95}$Ti$_{0.15}$Ni$_{0.9}$, Mg$_2$Ni, Mg$_{2.0}$Ni$_{0.6}$Co$_{0.4}$, Mg$_2$Ni$_{0.6}$Mn$_{0.4}$, Mg$_2$Ni$_{0.7}$Cu$_{0.3}$, Mg$_{0.8}$La$_{0.2}$Ni, Mg$_{2.0}$Co$_{0.1}$Ni, Mg$_{2.1}$Cr$_{0.1}$Ni, Mg$_{2.0}$Nb$_{0.1}$Ni, Mg$_{2.0}$Ti$_{0.1}$Ni, Mg$_{2.0}$V$_{0.1}$Ni, Mg$_{1.3}$Al$_{0.7}$Ni, Mg$_{1.5}$Ti$_{0.5}$Ni, Mg$_{1.5}$Ti$_{0.3}$Zr$_{0.1}$Al$_{0.1}$Ni, Mg$_{1.75}$Al$_{0.25}$Ni and (MgAl)$_2$Ni, Mg$_{1.70}$Al$_{0.3}$Ni.

For example, present anode materials are alloys of Mg and Ni in an atomic ratio of from about 1:2 to about 2:1 which may be modified by one or more elements selected from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, Nb, Sc and Ca. The modifying element or elements may be present from about 0.1 to about 30 atomic percent (at %) or from about 0.25 to about 15 at % or from about 0.5, about 1, about 2, about 3, about 4 or about 5 at % to about 15 at %, based on the total alloy. The atomic ratio of Mg and Ni is for instance about 1:1.

Suitable anode materials may comprise Mg and Ni in an atomic ratio of from about 1:2 to about 2:1 and further comprise Co and/or Mn. Suitable anode materials are for instance $Mg_{52}Ni_{39}Co_6Mn_3$ and $Mg_{52}Ni_{39}Co_3Mn_6$.

Suitable high capacity anode materials are disclosed for example in U.S. Pat. Nos. 5,616,432 and 5,506,069.

The alloys may be formed via melt spinning rapid solidification and/or mechanical alloying. Other methods include RF sputtering, laser ablation.

The active materials of the positive electrode (cathode materials) participate in the charge/discharge reactions. The active materials are for instance nickel hydroxide active materials, i.e. nickel hydroxide or modified nickel hydroxide.

The cathode materials may comprise a multi-phase disordered nickel hydroxide material having at least one modifier. The at least one modifier is for instance a metal, a metallic oxide, a metallic oxide alloy, a metal hydride and/or a metal hydride alloy. For example, the modifier is one or more components selected from the group consisting of Al, Ba, Ca, F, K, Li, Mg, Na, Sr, Bi, Co, Cr, Cu, Fe, In, $LaH_3$, Mn, Ru, Sb, Sn, $TiH_2$, TiO, and Zn. Such materials are taught in U.S. Pat. No. 5,348,822.

Suitable cathode materials may comprise a disordered multi-phase nickel hydroxide matrix including at least one modifier, for example 3 modifiers, chosen from F, Li, Na, K, Mg, Ba, Ln, Se, Nd, Pr, Y, Co, Zn, Al, Cr, Mn, Fe, Cu, Zn, Sc, Sn, Sb, Te, Bi, Ru and Pb. Suitable cathode materials are taught for example in U.S. Pat. No. 5,637,423.

Cathode materials may comprise nickel hydroxide modified with one or more group II elements and Co in a solid solution state. Such materials are taught in U.S. Pat. No. 5,366,831.

The cathode active materials may comprise nickel hydroxide and one or more components selected from the group consisting of cobalt, cobalt hydroxide and cobalt oxide and a carbon powder. The cathode materials may further comprise a compound of Ca, Sr, Ba, Cu, Ag or Y, for example $Ca(OH)_2$, CaO, $CaF_2$, CaS, $CaSO_4$, $CaSi_2O_5$, $CaC_2O_4$, $CaWO_4$, $SrCO_3$, $Sr(OH)_2$, BaO, $Cu_2O$, $Ag_2O$, $Y_2(CO_3)_3$ or $Y_2O_3$. Suitable cathode materials are taught for instance in U.S. Pat. No. 5,451,475.

Cathode active materials may comprise a metal oxide and one or more of Co, Ca, Ag, Mn, Zn, V, Sb, Cd, Y, Sr, Ba and oxides of Ca, Sr, Ba, Sb, Y or Zn. The metal oxide is for example nickel oxide and or manganese oxide. Such active materials are taught in U.S. Pat. No. 5,455,125.

The cathode materials may contain nickel hydroxide and a further component selected from the group consisting of Y, In, Sb, Ba and Be and Co and/or Ca. Such materials are disclosed in U.S. Pat. No. 5,466,543.

Cathode materials may be prepared by reacting nickel sulfate and ammonium hydroxide to form a nickel ammonium complex; the complex is then reacted with sodium hydroxide to form nickel hydroxide. The method may provide nickel hydroxide comprising one or more of Co, Zn and Cd. These materials are taught in U.S. Pat. No. 5,498,403.

Cathode active materials may comprise nickel hydroxide and cobalt oxyhydroxide as taught in U.S. Pat. No. 5,489,314.

Cathode materials may comprise nickel hydroxide, cobalt monoxide and elemental zinc as taught in U.S. Pat. No. 5,506,070.

The cathode materials may comprise nickel hydroxide, nickel powder, a second powder and at least one of cobalt, cobalt hydroxide and cobalt oxide. The second powder contains one or more of Ca, Sr, Ba, Cu, Ag and Y. Such materials are taught in U.S. Pat. No. 5,571,636.

The cathode active materials may comprise particles of nickel hydroxide or manganese hydroxide having at least partially embedded therein a conductive material. The conductive material may be for instance nickel, nickel alloys, copper, copper alloys; metal oxides, nitrides, carbides, silicides or borides; or carbon (graphite). These materials are disclosed in U.S. Pat. No. 6,177,213.

The cathode materials may comprise nickel hydroxide particles containing at least three modifiers selected from the group consisting of Al, Bi, Ca, Co, Cr, Cu, Fe, In, La, rare earths, Mg, Mn, Ru, Sb, Sn, Ti, Ba, Si, Sr and Zn. For example, nickel hydroxide particles may contain at least four modifiers, for instance, Ca, Co, Mg and Zn. Such materials are disclosed in U.S. Pat. No. 6,228,535.

The active cathode material for instance comprises nickel hydroxide and a carbon material such as graphite. The active material may also comprise a polymeric binder. The polymeric binder is for example a thermoplastic organic polymer, for instance selected from the group consisting of polyvinyl alcohol (PVA), polyethylene oxide, polypropylene oxide, polybutylene oxide, methyl cellulose, carboxymethyl cellulose, hydroxyethyl cellulose, hydroxypropyl cellulose, hydroxypropylmethyl cellulose, polyethylene, polypropylene, polyisobutylene, polyvinyl chloride, polyvinyliden chloride, polyvinyliden fluoride, polytetrafluoroethylene (PTFE), fluorinated ethylene propylene (FEP), perfluroalkoxy (PFA), polyvinylacetate, polyvinyl isobutylether, polyacrylonitrile, polymethacrylonitrile, polymethylmethacrylate, polymethylacrylate, polyethylmethacrylate, allyl acetate, polystyrene, polybutadiene, polyisoprene, polyoxymethylene, polyoxyethylene, polycyclic thioether, polydimethylsiloxane, polyesters such as polyethylene terephthalate, polycarbonate and polyamide. Blends and copolymers of the above are also suitable. The polymeric binder may also be an elastomer or rubber such as styrene-butadiene copolymer, styrene-butadiene-styrene block copolymer, styrene-isoprene block copolymer, styrene-isoprene-styrene block copolymer, styrene-ethylene-styrene-butadiene block copolymer, styrene-ethylene-butadiene-styrene block copolymer or styrene-acrylonitrile-butadiene-methyl acrylate copolymer. Suitable active materials are taught for instance in U.S. Pat. No. 6,617,072.

The cathode active material may contain nickel hydroxide and nickel oxyhydroxide as taught in U.S. Pat. No. 7,396,379.

Generally, cathode active material particles are formed in a sintered or pasted electrode. The pasted electrode may be made by mixing the material with various additives and/or binders and applying the paste to a conductive support. Preferably, one or more cobalt additives are added to the pasted electrode. The cobalt additives may include Co and/or CoO to enhance conductivity, improve utilization and reduce electrical resistance of the positive electrode.

In general, cathode active materials are nickel hydroxide or modified nickel hydroxide. Modified nickel hydroxide may contain one or more modifiers such as Co, Cd, Ag, V, Sb, Ca, Mg, Al, Bi, Cr, Cu, Fe, In, rare earths, Mn, Ru, Sn, Ti, Ba, Si, Sr or Zn. A suitable modified nickel hydroxide is (Ni,Co,Zn)(OH)$_2$, for instance in the form of a spherical powder. In modified nickel hydroxides, nickel generally is present at a level of ≥80 atomic percent, for instance ≥90 atomic percent, based on the metals.

For example, the MH battery comprises at least one negative electrode which comprises an AB$_X$ type alloy capable of reversibly storing hydrogen and comprises as least one positive electrode comprising nickel hydroxide or modified nickel hydroxide active materials.

A separator may be present which separates the negative electrodes from the positive electrodes. The separator is for instance a nonwoven web of natural or synthetic fibers. Natural fibers include cotton. Synthetic fibers include polyamide, polyester, polypropylene (PP), polyethylene (PE), PP/PE copolymer, polytetrafluoroethlene (PTFE), polyvinylchloride and glass.

The ionic compounds may be protic compounds selected from the group consisting of Brønsted acids (protic acids) and protic ammonium compounds or oxonium compounds. Brønsted acids for instance have a pKa of less than or equal to about 5.

The ionic compounds may be aprotic compounds selected from the group consisting of ammonium compounds, oxonium compounds, phosphonium compounds and alkali or alkali earth metal compounds.

The ionic compounds contain a cation and an anion.

Alkali metal or alkali earth metal cations include Li$^+$, Na$^+$, K$^+$, Rb+, Cs+, Be$^{++}$, Mg$^{++}$, Ca$^{++}$, Sr$^{++}$ and Ba$^{++}$.

Ammonium ions are cations of formula $^+$NR$_1$ R$_2$R$_3$R$_4$ where R$_1$, R$_2$, R$_3$ and R$_4$ are selected from hydrogen and hydrocarbyl or two of R$_1$—R$_4$ together are hydrocarbylene or three of R$_1$—R$_4$ together are hydrocarbylene. When one or more of R$_1$—R$_4$ is hydrogen, the ammonium ion is protic. When all four of R$_1$—R$_4$ are hydrocarbyl or hydrocarbylene the ammonium ion is aprotic.

Ammonium ions also include hydrazinium cations of formula R$_1$R$_2$N—$^+$NR$_3$R$_4$R$_5$, where R$_1$, R$_2$, R$_3$, R$_4$ and R$_5$ are selected from hydrogen and hydrocarbyl or R$_1$ and R$_2$ together and/or two of R$_3$—R$_5$ together are hydrocarbylene.

Ammonium ions also include hydroxylammonium cations of formula HO—N$^+$R$_1$R$_2$R$_3$ where R$_1$, R$_2$ and R$_3$ are selected from hydrogen and hydrocarbyl or two of R$_1$—R$_3$ together are hydrocarbylene.

Oxonium ions are positively charged groups of formula $^+$OR$_1$ R$_2$R$_3$ where R$_1$, R$_2$ and R$_3$ are selected from hydrogen and hydrocarbyl or two of R$_1$—R$_3$ together are hydrocarbylene. When one or more of R$_1$—R$_3$ is hydrogen, the oxonium is protic. When all three of R$_1$—R$_3$ are hydrocarbyl or hydrocarbylene, the oxonium is aprotic.

Phosphonium ions are positively charged groups of formula $^+$PR$_1$ R$_2$R$_3$R$_4$ where R$_1$, R$_2$, R$_3$ and R$_4$ are hydrocarbyl or two of R$_1$—R$_4$ together are hydrocarbylene.

Hydrocarbyl is any hydrocarbon based group, bound to the cationic nitrogen, oxygen or phosphorus with a carbon atom. Hydrocarbylene is a ring-forming version of hydrocarbyl.

Hydrocarbyl is for instance alkyl, alkenyl, cycloalkyl, cycloalkenyl, aryl or aralkyl, which may be substituted by one or more groups selected from the group consisting of halogen, hydroxy, C$_1$-C$_4$alkoxy, thio, C$_1$-C$_4$alkylthio, amino, C$_1$-C$_4$alkylamino, di-C$_1$-C$_4$alkylamino, nitro, cyano, —COOH and —COO$^-$. Hydrocarbyl may also be interrupted by one or more groups selected from the group consisting of —O—, —S—, —NH— and —N(C$_1$-C$_4$alkyl)-. Hydrocarbyl may be both substituted by one or more of said groups and interrupted by one or more of said groups. For instance alkyl, alkenyl, cycloalkyl, cycloalkenyl, aryl or aralkyl may be substituted by one to three groups selected from the group consisting of chloro, hydroxy, methoxy, ethoxy, propoxy, butoxy, thio, methylthio, methylamino, ethylamino, propylamino, butylamino, dimethylamino, diethylamino, dipropylamino, dibutylamino, —COOH, —COO$^-$ cyano and nitro and/or may be interrupted by one to three groups selected from the group consisting of —O—, —S—, —NH— and —N(C$_1$-C$_4$alkyl)-.

Hydrocarbyl also includes polyethylene glycols and polypropylene glycols such as R'(OC$_2$H$_4$)$_n$- or R'(OC$_3$H$_6$)$_n$- where R' is hydrogen or alkyl and n is an integer from 1 to 50, for instance from 1 to 40, 1 to 30 or 1 to 20, for instance from 1 to 10.

When two or three of R$_1$—R$_5$ together are hydrocarbylene, this means together with the N, O or P atom they form a heterocyclic ring. The ring is for example 5- or 6-membered. The heterocyclic ring may contain a further heteroatom and may be saturated or unsaturated. Hydrocarbylene is for instance —(CH$_2$)$_4$—, —(CH$_2$)$_5$—, —(CH$_3$)N—CH=C(CH$_3$)—CH=, =CH—CH=CH—CH=CH—, =C(CH$_3$)—C=CH—CH=CH—, =C—C(CH$_3$)=CH—CH=CH—, =C—CH=C(CH$_3$)—CH=CH—, —CH=CH—CH=CH—, —CH$_2$—CH—CH$_2$—CH$_2$—, —CH=CH—N=CH—, —CH$_2$CH$_2$NHCH$_2$CH$_2$—, —CH$_2$—CH$_2$—N=CH—, —CH$_2$—CH$_2$—O—CH$_2$—CH$_2$— or =CH—(CH$_2$)$_3$—. The further heteroatom is for example N, O or S.

Examples of ammonium ion rings are piperidinium, pyrrolinium, 2,4-dimethylpyrazolium, pyrrolininium, pyrrolidinium, pyridinium, morpholinium and methylpyridinium. Pyridinium is an example of where three of R$_1$—R$_4$ together form a ring. The hydrocarbylene ring may also be annulated to form for instance quinolinium or isoquinolinium.

Alkyl is for instance from 1 to 25 carbon atoms, is branched or unbranched and includes methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, icosyl and docosyl.

Alkenyl is an unsaturated version of alkyl, for instance allyl.

Cycloalkyl includes cyclopentyl, methylcyclopentyl, dimethylcyclopentyl, cyclohexyl, methylcyclohexyl, dimethylcyclohexyl, trimethylcyclohexyl, tert-butylcyclohexyl, cycloheptyl or cyclooctyl.

Cycloalkenyl is an unsaturated version of cycloalkyl.

Aryl includes phenyl, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl or 2,6-diethylphenyl.

Aralkyl includes benzyl, α-methylbenzyl, α,α-dimethylbenzyl and 2-phenylethyl.

Examples of protic ammonium ions include NH$_4^+$ (ammonium), methylammonium, ethylammonium, dimethylammonium, diethylammonium, trimethylammonium (NMe$_3$H$^+$), triethylammonium, tributylammonium, diethylmethylammonium, hydroxyethylammonium, methoxymethylammonium, dibutylammonium, methylbutylammonium, anilinium, pyridinium, 2-methylpyridinium, imidazolium, 1-methylimidazolium, 1,2-dimethylimidazolium, imidazolinium, 1-ethylimidazolium, 1-(4-sulfobutyl)-3-methylimidazolium, 1-allylimidazolium, quinolinium, isoquinolinium, pyrrolinium, pyrrolininium and pyrrolidinium.

Examples of aprotic ammonium ions include tetramethylammonium, tetraethylammonium, tetra-n-butylammonium, n-butyl-tri-ethylammonium, benzyl-tri-methylammonium, tri-n-butylmethylammonium, benzyl-tri-ethylammonium, 1-methylpyridinium, 1-butyl-3,5-dimethylpyridinium, 1,2,4-trimethylpyrazolium, trimethylhydroxyethylammonium (choline), tri-(hydroxyethyl)methylammonium, dimethyl-di(polyoxyethylene)ammonium, 1,2,3-trimethylimidazolium, 1-butyl-3-methylimidazolium, 1-ethyl-2,3-dimethylimidazolium, 1-allyl-3-methylimidazolium, 1-hydroxyethyl-3-methylimidazolium, 1,3-dimethylimidazolium, 1-ethyl-1-methylpiperidinium, 4-ethyl-4-methylmorpholinium, 1-(cyanomethyl)-3-methylimidazolium, 1-(3-cyanopropyl) pyridinium, 1,3-bis(cyanomethyl)imidazolium and 1-ethyl-3-methylimidazolium.

Pyrrolinium is the ammonium of pyrrole, pyrrolininium is the ammonium of pyrroline and pyrrolidinium is the ammonium of pyrrolidine. Pyrroline may be 1-, 2- or 3-pyrroline, thus the ammonium cation of 1-, 2- or 3-pyrroline is included.

An example of a hydrazinium ion is hydrazinium ($H_2NNH_3^+$).

An example of a hydroxylammonium ion is hydroxylammonium ($HO-NH_3^+$).

Examples of protic oxonium ions include $H_3O^+$ (hydronium), $H^+O(Et)_2$, $H_2EtO^+$, $H_2MeO^+$, $H^+O(Me)_2$, protonated THF and protonated 2-methyl-THF.

Examples of aprotic oxonium ions include $^+O(Me)_3$, $^+O(Et)_3$ and methylated or ethylated THF or 2-methyl-THF.

Me is methyl, Et is ethyl, nBu is n-butyl, tBu (or t-butyl) is tert-butyl and THF is tetrahydrofuran. Without designation, butyl means n-butyl.

Examples of phosphonium ions include methyltriphenylphosphonium, tetraphenylphosphonium, tetrabutylphosphonium, tributylmethylphosphonium, triethylmethylphosphonium, trihexyltetradecylphosphonium, triphenylpropylphosphonium and tetrakis(hydroxymethyl) phosphonium.

Examples of suitable anions are hydroxide, nitrate, perchlorate, bifluoride, alkoxides, halides, phosphates, phosphinates, phosphonates, borates, carboxylates, sulfites, sulfates, sulfonates, carbonates, imides, aluminates, cyanates, methides, arsenates, silicates and antimonates.

Anions, cations and ionic compounds may be those disclosed for instance in U.S. Pat. No. 6,254,797 and U.S. Pub. No. 2011/0045359.

Bifluoride is $HF_2^-$.

Alkoxides are $RO^-$ where R is hydrocarbyl, for example methoxide, ethoxide, n-propoxide, i-propoxide, n-butoxide, t-butoxide or phenoxide. Alkoxides also include where R is perfluoroalkyl.

Halide is chloride, bromide, iodide or fluoride.

Phosphates include dihydrogen phosphate, hydrogen phosphate, alkyl phosphate, dialkyl phosphate, phosphate, $PF_6^-$ (hexafluorophosphate), $HPO_3F^-$ (fluorohydrogen phosphate), trisoxalatophosphate (TOP), tetrafluorooxalatophosphate (TFOP) and fluoro(perfluoroalkyl)phosphates such as $F_2P(C_2F_5)_4^-$, $F_3P(C_2F_5)_3^-$ (tris(pentafluoroethyl)trifluorophosphate or FAP), $F_4P(C_2F_5)_2^-$, $F_2P(C_3F_7)_4^-$, $F_3F(C_3F_7)_3^-$, $F_4P(C_3F_7)_2^-$, $F_2F(C_4F_9)_4^-$, $F_3P(C_4F_9)_3^-$ and $F_4P(C_4F_9)_2^-$.

Phosphinates are for instance hydrogen alkyl phosphinate, dialkyl phosphinate, hydrogen aryl phosphinate or diaryl phosphinate. For instance bis(2,4-trimethylphenyl)phosphinate.

Phosphonates are for instance alkylphosphonate such as methylphosphonate or hydrogenphosphonate (phosphonate).

Borates include orthoborate, tetrahydroxyborate, tetraborate, tetraphenylborate, $[B(3,5-(CF_3)_2C_6H_3)_4]^-$ (BARF), $B(C_2O_4)2^-$ (bis(oxalato)borate) (BOB), difluoro(oxalato) borate (dFOB), di(trifluoroacetato)oxalatoborate (D(Ac)OB), $B(C_6F_5)_4^-$, $BF_4^-$ (tetrafluoroborate).

Carboxylate anions are of formula $RCOO^-$ where R is hydrogen or hydrocarbyl and include formate, acetate (ethanoate), propanoate, n-butanoate, i-butanoate, n-pentanoate, i-pentanoate, octanoate, decanoate, benzoate, salicylate, thiosalicylate, 2-, 3- or 4-nitrobenzoate; citrate, oxalate, tartrate, glycolate, gluconate, malate, mandelate, a carboxylate of nitrilotriacetic acid, a carboxylate of N-(2-hydroxyethyl)-ethylenediaminetriacetic acid, a carboxylate of ethylenediaminetetraacetic acid, a carboxylate of diethylenetriaminepentaacetic acid and haloalkylcarboxylates such as fluoroacetate, difluoroacetate, trifluoroacetate, chloroacetate, dichloroacetate and trichloroacetate.

Sulfites include sulfite and hydrogensulfite.

Sulfates include hydrogensulfate, sulfate, thiosulfate and alkylsulfates such as methylsulfate and ethylsulfate.

Sulfonates include alkyl, arylsulfonates and perfluoroalkylsulfonates, for instance trifluoromethanesulfonate (triflate), p-toluenesulfonate (tosylate) or methanesulfonate (mesylate).

Carbonate anions are for instance carbonate, hydrogencarbonate or an alkylcarbonate such as methylcarbonate, ethylcarbonate or butylcarbonate.

Imide anions include dicyanamide, $N(SO_2F)_2^-$((bisfluorosulfonyl)imide), bis(perfluoroalkylsulfonyl)imides such as $[N(SO_2CF_3)_2]^-$ (bistriflimide), bis(pentafluoroethylsulfonyl)imide and $N(CF_3SO_2)(CF_3(CF_2)_3SO_2)^-$ and (perfluoroalkylsulfonyl)(perfluoroalkylcarboxyl)imides.

Aluminates include $Al(OC(CF_3)_3)_4^-$, di(trifluoroacetato) oxalatoaluminate (d(Ac)OAl), tetrachloroaluminate, tetrafluoroaluminate, tetraiodoaluminate and tetrabromoaluminate.

Cyanates include thiocyanate and cyanate.

Methides include tris(perfluoroalkylsulfonyl)methides such as tris(trifluoromethylsulfonyl)methide, $C(CF_3SO_2)_3^-$.

Arsenates include arsenate, hydrogen arsenate, dihydrogen arsenate and $AsF_6^-$.

Silicates include $SiF_6^{-2}$.

Antimonates include $SbF_6^-$ and $Sb(OH)_6^-$.

For example, the protic ionic compound is $H_3PO_4$, $NH_4SO_3CF_3$, $NH_4BF_4$, $NH_4OH$, $NH_4Cl$, $NH_4Br$, $NH_4I$, $NH_4F$, $NH_4H_2PO_4$, $(NH_4)_2HPO_4$, methylammonium phosphonate, pyridinium tosylate, pyridinium chloride, anilinium chloride, hydroxylammonium chloride, $(NH_4)_2SO_4$, hydrazinium sulfate ($N_2H_6SO_4$), $(NH_4)HSO_4$, $NaHSO_4$, $NH_4BF_4$, $H_2SO_4$, $KH_2PO_4$, $K_2HPO_4$, $NaH_2PO_4$, $Na_2HPO_4$, $HBF_4$, $H(OEt_2)BF_4$, $HPF_6$, $HAsF_6$, $HClO_4$, $HSO_3CF_3$, $H[N(SO_2CF_3)_2]$ or $H[N(SO_2CF_2CF_3)_2]$.

The protic ionic compound may also be an oxonium ion of a highly non-coordinating ion such as Brookhart's acid (BARF acid), $[H(OEt_2)_2][B[3,5-(CF_3)_2C_6H_3]_4]$. Other examples include $[H(OEt_2)_2][B(C_6F_5)_4]$ (oxonium acid) and $[H(OEt_2)_2][Al(OC(CF_3)_3)_4]$. In these cases the cation is protonated diethyl ether (diethyl ether oxonium). Alternatively, the cation may be other protonated ethers, for instance protonated tetrahydrofuran (THF).

The protic ionic compound may be a protic ionic liquid such as ethylammonium nitrate, diethylmethylammonium trifluoromethanesulfonate (DEMA TfO), triethylammonium methanesulfonate, 2-methylpyridinium trifluoromethanesulfonate, ammonium fluoride, methylammonium nitrate, hydroxyethylammonium nitrate, ethylammonium nitrate, dimethylammonium nitrate, 1-methylimidazolium nitrate, 1-ethylimidazolium nitrate, t-butylammonium tetrafluoroborate, hydroxyethylammonium tetrafluoroborate, methylbutylammonium tetrafluoroborate, triethylammonium tetrafluoroborate, imidazolium tetrafluoroborate, 1-methylimidazolium tetrafluoroborate, 1,2-dimethylimidazolium tetrafluoroborate, t-butylammonium triflate, 2-fluoropyridinium triflate, hydroxyethylammonium triflate, 1,2-dimethylimidazolium triflate, imidazolium triflate, 1-methylimidazolium hydrogensulfate, 1-methylimidazolium chloride, 1-methylimidazolium triflate, hydronium triflate, methylammonium mesylate, ethylammonium mesylate, butylammonium mesylate, methoxyethylammonium mesylate, dimethylammonium mesylate, dibutylammonium mesylate, triethylammonium mesylate, dimethylethylammonium mesylate, hydronium hydrogensulfate, ammonium hydrogensulfate, methylammonium hydrogensulfate, ethylammonium hydrogensulfate, propylammonium hydrogensulfate, n-butylammonium hydrogensulfate, t-butylammonium hydrogensulfate, dimethylammonium hydrogensulfate, diethylammonium hydrogensulfate, di-n-butylammonium hydrogensulfate, methylbutylammonium hydrogensulfate, ethylbutylammonium hydrogensulfate, trimethylammonium hydrogensulfate, triethylammonium hydrogensulfate, tributylammonium hydrogensulfate, dimethylethylammonium hydrogensulfate, dibutylammonium fluorohydrogen phosphate, triethylammonium fluorohydrogen phosphate, tributylammonium fluorohydrogen phosphate, hydronium dihydrogen phosphate, methylammonium dihydrogen phosphate, ethylammonium dihydrogen phosphate, propylammonium dihydrogen phosphate, n-butylammonum dihydrogen phosphate, methoxyethylammonium dihydrogen phosphate, dimethylammonium dihydrogen phosphate, dibutylammonium dihydrogen phosphate, methylbutylammonium dihydrogen phosphate, ammonium bifluoride, methylammonium bifluoride, ethylammonium bifluoride or dimethylammonium bifluoride.

Carboxylic acids are protic acids/protic compounds. Carboxylic acids are of formula RCOOH where R is hydrogen or hydrocarbyl. Carboxylic acids contain carboxylate anions.

For example, the carboxylic acids are selected from the group consisting of formic acid, acetic acid, fluoroacetic acid, difluoroacetic acid, trifluoroacetic acid, chloroacetic acid, dichloroacetic acid, trichloroacetic acid, propanoic acid, butyric acid, 3-methylbutanoic acid, valeric acid, hexanoic acid, heptanoic acid, caprylic acid, nonanoic acid, benzoic acid, salicylic acid, 2-, 3- or 4-nitrobenzoic acid; citric acid, oxalic acid, tartaric acid, glycolic acid, gluconic acid, malic acid, mandelic acid, nitrilotriacetic acid, N-(2-hydroxyethyl)-ethylenediaminetriacetic acid, ethylenediaminetetraacetic acid and diethyleneaminepentaacetic acid.

Certain carboxylic acids fall within the definition of ionic liquids according to this invention, for example acetic acid.

For example, the aprotic ionic compound is $NMe_4^+ SO_3CF_3^-$, $NMe_4OH$, $NEt_4^+BF_4^-$, $NMe_4^+Cl^-$, $NEt_4^+Br^-$, $NnBu_4^+I^-$, $NnBu_4^+F^-$, $NEt_4^+H_2PO_4^-$, $(NMe_4)_2HPO_4$, methyltriphenyl phosphonium iodide, tetrakis(hydroxymethyl) phosphonium chloride, tetraphenylphosphonium bromide, 1-methylpyridinium chloride, benzalkonium chloride, $Me_3OBF_4$, $Et_3OBF_4$, $NEt_4PF_6$, $NMe_4AsF_6$, $NMe_4ClO_4$, $NEt_4SO_3CF_3$, $NMe_4[N(SO_2CF_3)_2]$ or $NEt_4[N(SO_2CF_2CF_3)_2]$.

The aprotic ionic compound may also include a highly non-coordinating anion such as BARF, for instance sodium BARF, $Na^+B[3,5-(CF_3)_2C_6H_3]_4^-$. Other examples include $K^+B(C_6F_5)_4^-$ and $K^+Al(OC(CF_3)_3)_4^-$.

The aprotic ionic compound may be an aprotic ionic liquid such as tri-n-butylmethylammonium methylsulfate, 1-ethyl-2,3-dimethylimidazolium ethylsulfate, 1-butyl-3-methylimidazolium thiocyanate, 1-butyl-3-methylimidazolium tetrachloroaluminate, 1-butyl-3-methylimidazolium methylsulfate, 1-butyl-3-methylimidazolium methanesulfonate, 1-butyl-3-methylimidazolium hydrogencarbonate, 1-butyl-3-methylimidazolium hydrogensulfate, 1-butyl-3-methylimidazolium chloride, 1,2,3-trimethylimidazolium methylsulfate, tris-(hydroxyethyl)methylammonium methylsulfate, 1,2,4-trimethylpyrazolium methylsulfate, 1,3-dimethylimdiazolium hydrogencarbonate, 1-ethyl-3-methylimidazolium hydrogencarbonate, 1-ethyl-3-methylimidazolium chloride, 1-ethyl-3-methylimidazolium tetrachloroaluminate, 1-ethyl-3-methylimidazolium thiocyanate, 1-ethyl-3-methylimidazolium methanesulfonate, 1-ethyl-3-methylimidazolium hydrogensulfate, 1-ethyl-3-methylimidazolium ethylsulfate, 1-ethyl-3-methylimidazolium nitrate, 1-butylpyridinium chloride, 1-ethyl-3-methylimidazolium dicyanamide, 1-ethyl-3-methylimidazolium tetrafluoroborate, 1-ethyl-3-methylimidazolium hexafluorophosphate, 1-butyl-3,5-dimethylpyridinium bromide, 1-ethyl-3-methylimidazolium bis(trifluoromethylsulfonyl)imide, 1-ethyl-3-methylimidazolium bis(pentafluoroethylsulfonyl)imide, 1-ethyl-2,3-dimethylimidazolium methylcarbonate, carboxymethyl-tributylphosphonium bis(trifluoromethylsulfonyl)imide, N-carboxyethyl-methylpyrrolidinium bis(trifluoromethylsulfonyl)imide, N-carboxymethyl-trimethylammonium bis(trifluoromethylsulfonyl)imide, N-carboxymethyl-methylpyridinium bis(trifluoromethylsulfonyl)imide, hexyltrimethylammonium bis(trifluromethylsulfonyl)imide, tetrabutylphosphonium methanesulfonate, triethylmethylammonium methylcarbonate, 1-ethyl-1-methylpiperidinium methylcarbonate, 4-ethyl-4-methylmorpholinium methylcarbonate, 1-butyl-1-methylpyrrolidinium methylcarbonate, triethylmethylammonium dibutylphosphate, tributylmethylphosphonium dibutylphosphate, triethylmethylphosphonium dibutylphosphate, tetrabutylphosphonium tetrafluoroborate, tetrabutylphosphonium p-toluenesulfonate, tributylmethylphosphonium methylcarbonate, 1-ethyl-3-methylimidazolium hydrogencarbonate, tributylmethylammonium methylcarbonate, tributylmethylammonium dibutylphosphate, 1-ethyl-3-methylimidazolium dibutylphosphate, 1-butyl-3-methylimidazolium dibutylphosphate, 1-(cyanomethyl)-3-methylimidazolium chloride, 1-(3-cyanopropyl)-3-methylimidazolium chloride, 1-(3-cyanopropyl)-3-methylimidazolium bis(trifluoromethylsulfonyl)imide, 1-(3-cyanopropyl)-3-methylimidazolium dicyanamide, 1-(3-cyanopropyl)pyridinium chloride, 1-(3-cyanopropyl)pyridinium bis(trifluoromethylsulfonyl)imide, 1,3-bis(cyanomethyl)imidazolium chloride, 1,3-bis(cyanomethyl)imidazolium bis(trifluoromethylsulfonyl)imide, 1,3-bis(cyanopropyl)imidazolium chloride, 1,3-bis(3-cyanopropyl)imidazolium bis(trifluoromethylsulfonyl)imide, 1-butyl-3-methylimidazolium hexafluorophosphate, 1-butyl-3-methylimidazolium tetrafluoroborate, 1-ethyl-3-methylimidazolium tetrafluoroborate, 1-ethyl-3-methylimidazolium chloride, 1-ethyl-3-methylimidazolium bromide, 1-butyl-3-methylimidazolium bromide, 1-hexyl-3- methylimidazolium chloride, tributylmethylphosphonium methylsulfate, triethylmethylphosphonium dibutylphosphate, trihexyltetradecylphosphonium bis(trifluromethylsulfonyl)imide, trihexyltetradecylphosphonium bis(2,4,4-trimethylphenyl)phosphinate, trihexyltetradecylphosphonium bromide, trihexyltetradecylphosphonium chloride, trihexyltetradecylphosphonium decanoate, trihexyltetradecylphosphonium dicyanamide, 3-(triphenylphosphonio)propane-1-sulfonate or 3-(triphenylphosphonio) propane-1-sulfonic acid tosylate.

Examples of carboxylate compounds are tetramethylammonium benzoate, tetraethylammonium oxalate, tetrabutylammonium tartrate, sodium tartrate, potassium formate, tetramethylammonium acetate, 1-methylpyridinium chloride, trimethylammonium citrate tri-basic, tetramethylammonium 2-, 3- or 4-nitrobenzoate, ammonium benzoate, ammonium salicylate, ammonium oxalate, ammonium tartrate, methyltriphenyl phosphonium acetate, tetrakis(hydroxymethyl)phosphonium benzoate, tetrakis(hydroxymethyl)phosphonium formate, mono- or di-potassium tartrate, ammonium citrate mono-, di- or tri-basic; ammonium 2-nitrobenzoate, ammonium 3-nitrobenzoate, ammonium 4-nitrobenzoate, potassium trifluoroacetate and potassium chloroacetate.

In polybasic carboxylic acids, ammonium and/or alkali metal and/or alkali earth metal ions may replace one or any number of the acidic hydrogens to form a present carboxylate compound. For instance included are the mono-, di- and tri-basic ammonium citrates and mono-, di- and tri-basic sodium citrates.

According to this invention, ionic liquids are ionic compounds that exhibit a melting point of ≤150° C.

Otherwise, the ionic compound is "a salt" with a melting point>150° C.

Salts include halide salts such as alkali or alkali earth metal halide salts such as NaCl, KCl or KBr as well as other ionic compounds with melting points above 150° C. Alkali and alkali earth metal salts include for instance anions selected from the group consisting of nitrate, perchlorate, bifluoride, halides, phosphates, phosphinates, phosphonates, borates, carboxylates, sulfites, sulfates, sulfonates, carbonates, imides, aluminates, cyanates, methides, arsenates, silicates and antimonates.

The present ionic compounds may contain the cation and anion together in the same molecule. Thus, also included are zwitterionic compounds (inner salts) such as betaines. Included are zwitterions containing ammonium or phosphonium ions and sulfonate or sulfate ions. Included are hydroxysultaines, 4-(triphenylphosphonio)butane-1-sulfonate, methyl N-(triethylammoniosulfonyl) carbamate (Burgess reagent) and phosphonium sulfate zwitterions as taught for instance in U.S. Pat. No. 3,471,544. Included is sulfamic acid.

Advantageously, at least two different ionic compounds are employed in the electrolyte composition. For instance, the two different ionic compounds may be a protic ionic compound and an aprotic ionic compound or may be an ionic liquid and a salt.

For instance, present electrolyte compositions may comprise at least two different ionic liquids. The electrolyte composition may comprise one or more ionic liquids and one or more salts, for example a protic or aprotic ammonium salt or an alkali metal salt such as an alkai metal halide.

The electrolyte composition may contain a mixture of a carboxylate compound and a carboxylic acid. The electrolyte composition may contain a mixture of a carboxylate-containing ionic liquid and a carboxylic acid. The electrolyte composition may contain two different carboxylic acids.

The electrolyte composition may contain a protic acid, protic ammonium compound or a protic oxonium compound and an ionic liquid.

Where at least two different ionic compounds are present, the weight:weight ratio of the two different ionic compounds is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

In the two different ionic compounds, the cations or the anions may be identical.

The electrolyte composition may contain essentially no inadvertent water, for instance ≤1000 ppm, ≤100 ppm or ≤10 ppm by weight water, based on the total weight of the electrolyte composition.

The electrolyte composition may advantageously contain a solvent. Alternatively, the electrolyte composition may contain no solvent. For instance, solvents are not required when one or more ionic liquids are employed in the electrolyte composition. "No solvent" means no organic solvent is present and essentially no inadvertent water is present.

Where a solvent is present in the electrolyte composition, the weight:weight ratio of ionic compounds in total to solvent may be from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

The present electrolyte compositions may not be limited by the hydrogen and oxygen evolution potential of water. Thus, also subject of this invention is metal hydride battery which exhibits a nominal open-circuit voltage of >1.2 V (volts). The present MH batteries may supply a nominal open-circuit voltage up to about 5.0 V. For instance, present MH batteries may exhibit a nominal open-circuit voltage of from about 1.2 to about 5.0 V, from about 1.3 to about 5.0 V, from about 1.4 to about 5.0 V or from about 1.5 to about 5.0 V. For instance, present MH batteries may exhibit a nominal open-circuit voltage of about 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9 or about 5.0 V.

Solvents are water and organic solvents.

The solvent may consist essentially of water or may consist essentially of organic solvent. The solvent may contain varying ratios of water:organic solvent.

When the solvent consists essentially of organic solvent, water may only be present at very low levels, for example ≤1000 ppm, ≤100 ppm or ≤10 ppm by weight water, based on the total weight of the electrolyte composition. When the solvent consists essentially of water, organic solvents may only be present at the same low levels.

For example the solvent may be a water/organic solvent mixture where the weight:weight ratio of water to organic solvent is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

The electrolyte composition may contain organic solvent and no water. The electrolyte composition may contain water and no organic solvent.

Suitable organic solvents are for instance selected from the group consisting of organic carbonates, ethers, glymes, ortho esters, polyalkylene glycols, esters, lactones, glycols, formates, sulfones, sulfoxides, amides, alcohols, amines, ketones, nitro solvents, nitrile solvents and combinations thereof.

Organic carbonates are cyclic or acyclic and include ethylene carbonate (EC), propylene carbonate (PC), trimethylene carbonate, 1,2-butylene carbonate (BC), dimethyl carbonate (DMC), diethyl carbonate (DEC), ethylmethyl carbonate (EMC), vinylene carbonate, difluoroethylene carbonate and monofluoroethylene carbonate.

Ethers and glymes include dimethoxymethane (DMM), diethoxymethane, 1,2-dimethoxyethane (DME or ethyleneglycol dimethylether or glyme), diglyme, triglyme, tetraglyme, ethyleneglycol diethylether (DEE), ethyleneglycol dibutylether, diethyleneglycol diethylether, tetrahydrofuran (THF), 2-methyltetrahydrofuran (2-MeTHF), 1,3-dioxane, 1,3-dioxolane (DIOX), 4-methyl-1,3-dioxolane (4-MeDIOX), 2-methyl-1,3-dioxolane (2-MeDIOX), 1,4-dioxane, dimethylether, ethylmethylether, diethylether, di-n-butylether, di-t-butylether, di-isopropylether, methyl-t-butylether, ethyl-t-butylether and t-amyl-methylether.

Ortho esters include trimethoxymethane, triethoxymethane, 1,4-dimethyl-3,5,8-trioxabicyclo[2.2.2]octane and 4-ethyl-1-methyl-3,5,8-trioxabicyclo[2.2.2]octane.

Polyalkylene glycols are homo- or cooligomers or homo- or copolymers of $C_1$-$C_4$alkylene glycols. For instance, polyethylene glycol (PEG) or monomethyl, dimethyl or diethyl (end-capped) polyethylene glycol. Weight average molecular weights (Mw) of polyalkylene glycols are for example from about 200 to about 1200 g/mol, from about 200 to about 1000 g/mol, from about 200 to about 900 g/mol, from about 200 to about 700 g/mol or from about 200 to about 500 g/mol. Included are oligomers of 4 monomers and more, for instance tetraethylene glycol, fluorinated tetraethylene glycol and tetrapropylene glycol. For instance PEG 200, PEG 300, PEG 400, PEG 500, PEG 600, PEG 700, PEG 800, PEG 900 or PEG 1000.

Esters and lactones include γ-butyrolactone (GBL), γ-valerolactone, δ-valerolactone, ethyl acetate (EA), 2-methoxyethyl acetate, 2-ethoxyethyl acetate, 2-butoxyethyl acetate, 2-(2-butoxyethoxy) ethyl acetate (diethylene glycol butyl ether acetate, DBA), ethylene glycol diacetate (EGDA), 3-ethoxy ethyl propionate (EEP), methyl butyrate (MB), n-amyl acetate (NAAC), propylene glycol methyl ether acetate (PMA), ethyl butryate (EB), diethyl malonate, dimethyl malonate and dibasic ester mixture (DBE).

Dibasic ester mixture includes for instance methyl esters of adipic, glutaric and succinic acids.

Glycols include ethylene glycol, propylene glycol, 2-methoxyethanol, 2-ethoxyethanol, 2-propoxyethanol, 2-isopropoxyethanol, 2-butoxyethanol (ethylene glycol butyl ether, EB), 2-phenoxyethanol, 2-benzyloxyethanol, 2-(2-methoxyethoxy)ethanol, 2-(2-ethoxyethoxy)ethanol, 2-(2-butoxyethoxy)ethanol (diethylene glycol butyl ether, DB), propylene glycol butyl ether (PB), propylene glycol methyl ether (PM), triethylene glycol (TEG), dipropylene glycol methyl ether (DPM), diethylene glycol methyl ether, 1,3-butanediol, 1,4-butanediol, 1,5-pentanediol, perfluoro-1,4-butanediol, perfluoro-1,5-butanediol, fluorinated diethylene glycol methyl ether, fluorinated triethylene glycol, fluorinated triethylene glycol methyl ether and fluorinated diethylent glycol butyl ether.

Formates include methyl formate, ethyl formate, isobutyl formate and tert-butyl formate.

Sulfones and sulfoxides include methylsulfonylmethane (MSM or dimethylsulfone), ethylmethylsulfone, sulfolane and dimethylsulfoxide (DMSO).

Amides include dimethylformamide (DMF), N-methylpyrrolidone (NMP), 2-pyrrolidone, 1,3-dimethyl-2-imidazolidinone (DMI), hexamethylphosphoramide (HMPA) and N,N'-dimethyl-N,N'-trimethyleneurea (1,3-dimethyl-3,4,5,6-tetrahydro-2(1H)-pyrimidinone (DMPU)).

Alcohols include for example benzylalcohol (BA), ethanol, trifluoroethanol (2,2,-trifluoroethanol), methanol, isopropanol, t-butanol and n-butanol.

Ketones include for example methylethylketone (MEK) and methyl-isoamylketone (MIAK).

Amines include for example triethylamine, tributylamine, diethylenetriamine, ethylenediamine, morpholine, piperidine and pyridine.

Nitro solvents include nitrobenzene, nitromethane and nitroethane.

Nitrile solvents include acetonitrile, propionitrile, butyronitrile and adiponitrile.

Advantageously, a mixture of solvents is employed, for instance a mixture of organic carbonates or a mixture of one or more organic carbonates and one or more ether or glyme.

Suitable other organic solvents may be employed, for example toluene, hexane, heptane and the like.

Additives may be incorporated in the electrolyte compositions of the invention.

Additives are for instance selected from the group consisting of corrosion inhibitors, solid electrolyte interface (SEI) improvers, proton evolution improvers, self-discharge inhibitors, anti-gassing agents, viscosity adjusting agents, cathode protection agents, salt stabilizers, conductivity improvers and solvating agents.

Corrosion inhibitors are for example fluorinated oil, sodium stannate, sodium citrate or polyacrylic acids.

Solid electrolyte interface improvers are for instance fluoride sources intended to fluorinate the surface of the metal hydride. Fluoride sources are for instance HF or KF. SEI improvers also include oxides or hydroxides of rare earths such as Y, which inhibit the formation of a thick oxide on the negative electrode. SEI improvers also include metal porphines which serve to reduce oxidation of the alloy surface. For example Ni or Fe porphine. SEI improvers may also incude vinylene carbonate, vinylethylene carbonate, methylene ethylene carbonate and fluoro-ethylene carbonate.

Self-discharge inhibitors include surfactants such as polyglycols, polyglycol alkyl ethers, polyglycol alkyl phosphate esters and polysorbates. Included are polyethylene glycol (PEG), polypropylene glycol, polysorbate 20, polysorbate 40 and polysorbate 80. Advantageously, a mixture of PEG 600 and polysorbate 20 are employed together or a mixture of PEG 600 and ZnO are employed together.

Anti-gassing additives include phosphate ester-based surfactants, propane sultone and fluoropropane sultone.

Viscosity adjusting agents include for instance DMSO.

Additives are for example employed at a level of from about 0.1% to about 15% by weight, based on the weight of the electrolyte composition.

If the electrolyte composition contains KOH and water, then one or more further components are also present, for example one or more further components selected from the group consisting of organic solvents, further ionic compounds and additives.

For example, the electrolyte composition may comprise KOH and one or more further ionic compounds, for example one or more further ionic compounds selected from the group consisting of NaOH, LiOH, $Mg(OH)_2$ and $Ca(OH)_2$.

The weight:weight ratio of KOH to the further ionic compounds is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

Electrolyte compositions containing KOH advantageously contain water and an organic solvent, for example a polyalkylene glycol. Alternatively, the solvent may consist solely of an organic solvent.

Certain embodiments of the invention include electrolyte compositions containing:

a) protic acid/water and/or organic solvent, b) protic ammonium compound/water and/or organic solvent, c) ionic liquid (protic or aprotic, ammonium or phosphonium compound), d) ionic liquid/water and/or organic solvent, e) alkali metal alkoxide/alcohol or glycol or polyalkylene glycol solvent, f) alkali metal hydroxide/organic solvent (e.g. PEG), g) alkali metal hydroxide/water and organic solvent (e.g. PEG), h) alkali metal carboxylate/carboxylic acid, i) carboxylic acid/water and/or organic solvent, j) alkali metal carboxylate/water and/or organic solvent, k) ionic compound of highly non-coordinating ion/water and/or organic solvent, l) mixture of at least two different ionic liquids, m) mixture of an ionic liquid and a protic or aprotic salt and n) mixture of an ionic liquid and a carboyxlate compound and/or a carboxylic acid.

Present electrolyte compositions are for instance liquid at room temperature (25° C.). Liquid includes syrupy high viscosity liquids. For example, the electrolyte compositions have a viscosity of from about 0.2 cP to about 100 cP at 25° C. For example the electrolyte compositions have a viscosity of ≤100 cP, ≤90 cP, ≤80 cP, ≤70 cP, ≤50 cP, ≤40 cP, ≤30 cP, ≤20 cP, ≤10 cP or ≤5 cP at 25° C.

Viscosity may be measured for instance with a rotational rheometer or with a microviscometer employing a rolling steel ball in a glass capillary timed and calibrated against control liquids. Viscosity may also be measured with a DVI or DVII Brookfield viscometer, a plate viscometer or an oscillating type viscometer.

Also subject of the present invention are the electrolyte compositions.

In 30% by weight aqueous KOH electrolyte, the half cell charge/discharge electrochemical reaction at the anode is (MH being metal hydride):

M+H$_2$O+e$^-$  MH+OH$^-$

Many of the present electrolyte compositions are neutral or acidic, that is where the pH is less than or equal to about 7.

Also subject of the invention is a metal hydride battery comprising at least one negative electrode, at least one positive electrode, a casing having said electrodes positioned therein and an electrolyte composition, where the electrolyte composition has a pH of less than or equal to about 7.

When employing present neutral or acidic electrolyte compositions, the half cell charge/discharge electrochemical reaction at the anode upon application of an electrical potential across the cell is:

M+H$^+$+e$^-$  MH.

Also subject of the present invention is a metal hydride battery comprising at least one negative electrode, at least one positive electrode, a casing having said electrodes positioned therein and an electrolyte composition, where the half cell charge/discharge electrochemical reaction at the anode upon application of an electrical potential across the cell is M+H$^+$+e$^-$  MH.

All values herein, e.g. voltage, viscosity, pH, pKa, etc. are determined at 25° C. and atmospheric pressure.

The terms "a" or "an" referring to elements of an embodiment may mean "one" or may mean "one or more".

The term "about" refers to variation that can occur, for example, through typical measuring and handling procedures; through inadvertent error in these procedures; through differences in the manufacture, source, or purity of ingredients used; through differences in methods used; and the like. The term "about" also encompasses amounts that differ due to different equilibrium conditions for a composition resulting from a particular initial mixture. Whether or not modified by the term "about," embodiments and claims include equivalents to the recited quantities.

All numeric values herein are modified by the term "about," whether or not explicitly indicated. The term "about" generally refers to a range of numbers that one of skill in the art would consider equivalent to the recited value (i.e., having the same function and/or result). In many instances, the term "about" may include numbers that are rounded to the nearest significant figure.

A value modified by the term "about" of course includes the specific value. For instance, "about 5.0" must include 5.0.

The term "consisting essentially of" means that the composition, method or structure may include additional ingredients, steps and/or parts, but only if the additional ingredients, steps and/or parts do not materially alter the basic and novel characteristics of the claimed composition, method or structure.

U.S. Patents, U.S. published patent applications and U.S. patent applications discussed herein are each hereby incorporated by reference.

Following are some embodiments of the invention.

E1. A metal hydride battery comprising at least one negative electrode, at least one positive electrode, a casing having said electrodes positioned therein and an electrolyte composition, where the electrolyte composition comprises one or more ionic compounds, where if the electrolyte composition comprises KOH and water, then the composition comprises one or more further components.

E2. A battery according to embodiment 1 where the ionic compounds are selected from the group consisting of protic acids, protic ammonium compounds and protic oxonium compounds.

E3. A battery according to claim 1 where the ionic compounds are selected from the group consisting of aprotic ammonium compounds, aprotic oxonium compounds, aprotic phosphonium compounds and alkali or alkali earth metal salts.

E4. A battery according to embodiment 1 where the one or more ionic compounds contain a cation selected from the group consisting of H$^+$, alkali ion, alkali earth ion, ammonium, methylammonium, ethylammonium, dimethylammonium, diethylammonium, trimethylammonium, triethylammonium, tributylammonium, diethylmethylammonium, hydroxyethylammonium, methoxymethylammonium, dibutylammonium, methylbutylammonium, anilinium, pyridinium, 2-methylpyridinium, imidazolium, 1-methylimidazolium, 1,2-dimethylimidazolinium, imidazolinium, 1-ethylimidazolium, 1-(4-sulfobutyl)-3-methylimidazolium, 1-allylimidazolium, quinolinium, isoquinolinium, pyrrolinium, pyrrolininium, pyrrolidinium, hydrazinium, hydroxylammonium, $H_3O^+$, $H^+O(Et)_2$, $H_2EtO^+$, $H_2MeO^+$, $H^+O(Me)_2$, protonated tetrahydrofuran and protonated 2-methyl-tetrahydrofuran.

E5. A battery according to embodiment 1 where the one or more ionic compounds contain a cation selected from the group consisting of $H^+$, ammonium, diethylmethylammonium, triethylammonium, hydroxyethylammonium, 2-methylpyridinium, 1,2,4-trimethylpyrazolium and 1-ethyl-3-methylimidazolium.

E6. A battery according to embodiment 1 where the one or more ionic compounds contain a cation selected from the group consisting of tetramethylammonium, tetraethylammonium, tetra-n-butylammonium, tri-n-butylmethylammonium, n-butyl-tri-ethylammonium, benzyl-tri-methylammonium, benzyl-tri-ethylammonium, 1-methylpyridinium, 1-butyl-3,5-dimethylpyridinium, 1,2,3-trimethylimidazolium, 1-ethyl-3-methylimidazolium, 1-butyl-3-methylimidazolium, 1-ethyl-2,3-dimethylimidazolium, 1-allyl-3-methylimidazolium, 1-hydroxyethyl-3-methylimidazolium, trimethylhydroxyethylammonium (choline), tri-(hydroxyethyl)methylammonium, dimethyl-di(polyoxyethylene)ammonium, 1-ethyl-1-methylpiperidinium, 4-ethyl-4-methylmorpholinium, 1-(cyanomethyl)-3-methylimidazolium, 1-(3-cyanopropyl) pyridinium, 1,3-bis(cyanomethyl)imidazolium, $^+O(Me)_3$, $^+O(Et)_3$, tetrahydrofuran-$Me^+$, tetrahydrofuran-$Et^+$, 2-methyltetrahydrofuran-$Me^+$, 2-methyltetrahydrofuran-$Et^+$, methyltriphenylphosphonium, tetraphenylphosphonium, tetrabutylphosphonium, tributylmethylphosphonium, triethylmethylphosphonium, trihexyltetradecylphosphonium, triphenylpropylphosphonium and tetrakis(hydroxymethyl)phosphonium.

E7. A battery according to any of the preceding embodiments where the one or more ionic compounds contain an anion selected from the group consisting of hydroxide, nitrate, perchlorate, bifluoride, alkoxides, halides, phosphates, phosphinates, phosphonates, borates, carboxylates, sulfites, sulfates, sulfonates, carbonates, imides, aluminates, cyanates, methides, arsenates, silicates and antimonates.

E8. A battery according to any of embodiments 1-6 where the one or more ionic compounds contain an anion selected from the group consisting of chloride, bromide, $H_2PO_4^-$, $BF_4^-$, dibutylphosphate, $HPO_3F^-$, hydrogensulfate, thiocyanate, bifluoride, perchlorate, dicyanamide, $Al(OC(CF_3)_3)_4^-$, $B(C_6F_5)_4^-$, $[N(SO_2CF_3)_2]^-$ (bistriflimide), bis(pentafluoroethylsulfonyl)imide, trifluoromethanesulfonate (triflate), p-toluenesulfonate (tosylate), methanesulfonate (mesylate), tetraphenylborate, $[B(3,5-(CF_3)_2C_6H_3)_4]^-$, $Al(OC(CF_3)_3)_4^-$, $B(C_6F_5)_4^-$, $[N(SO_2CF_3)_2^-$, $N(SO_2F)_2^-$, tris(pentafluoroethyl)trifluorophosphate, $B(C_2O_4)_2^-$, difluoro(oxalato)borate, tetrachloroaluminate, tetrafluoroaluminate, tetraiodoaluminate, tetrabromoaluminate, $AsF_6^-$, $PF_6^-$, $SbF_6^-$ and $SiF_6^{-2}$.

E9. A battery according to any of embodiments 1-6 where the one or more ionic compounds contain an anion selected from the group consisting of $BF_4^-$, hydrogensulfate, thiocyanate, perchlorate, dicyanamide, bis(pentafluoroethylsulfonyl)imide, trifluoromethanesulfonate, tetraphenylborate, $[B(3,5-(CF_3)_2C_6H_3)_4]^-$, $Al(OC(CF_3)_3)_4^-$, $B(C_6F_5)_4^-$, $[N(SO_2CF_3)_2]^-$, tetrachloroaluminate, tetrafluoroaluminate, tetraiodoaluminate, tetrabromoaluminate, $AsF_6^-$ and $PF_6^-$.

E10. A battery according to embodiment 1 where the one or more ionic compounds are selected from the group consisting of $H_3PO_4$, $NH_4SO_3CF_3$, $NH_4OH$, $NH_4BF_4$, $NH_4Cl$, $NH_4Br$, $NH_4I$, $NH_4F$, $NH_4H_2PO_4$, $(NH_4)_2HPO_4$, methylammonium phosphonate, pyridinium tosylate, pyridinium chloride, anilinium chloride, hydroxylammonium chloride, $(NH_4)_2SO_4$, hydrazinium sulfate $(N_2H_6SO_4)$, $(NH_4)HSO_4$, $NaHSO_4$, $NH_4BF_4$, $H_2SO_4$, $KH_2PO_4$, $K_2HPO_4$, $NaH_2PO_4$, $Na_2HPO_4$, $HBF_4$, $H(OEt_2)BF_4$, $HPF_6$, $HAsF_6$, $HClO_4$, $HSO_3CF_3$, $H[N(SO_2CF_3)_2]$, $H[N(SO_2CF_2CF_3)_2]$, $[H(OEt_2)_2][B[3,5-(CF_3)_2C_6H_3]_4]$, $[H(OEt_2)_2][B(C_6F_5)_4]$ (oxonium acid) and $[H(OBt_2)_2][Al(OC(CF_3)_3)_4]$.

E11. A battery according to embodiment 1 where the one or more ionic compounds are selected from the group consisting of $NMe_4^+SO_3CF_3^-$, $NEt_4^+BF_4^-$, $NMe_4^+OH^-$, $NMe_4^+Cl^-$, $NEt_4^+Br^-$, $NnBu_4^+I^-$, $NnBu_4^+F^-$, $NEt_4^+H_2PO_4^-$, $(NMe_4)_2HPO_4$, methyltriphenyl phosphonium iodide, tetrakis(hydroxymethyl)phosphonium chloride, tetraphenylphosphonium bromide, 1-methylpyridinium chloride, benzalkonium chloride, $Me_3OBF_4$, $Et_3OBF_4$, $NEt_4PF_6$, $NMe_4AsF_6$, $NMe_4ClO_4$, $NEt_4SO_3CF_3$, $NMe_4[N(SO_2CF_3)_2]$, $NEt_4[N(SO_2CF_2OF_3)_2]$, $Na^+B[3,5-(CF_3)_2C_6H_3]_4]^-$, $K^+B(C_6F_5)_4^-$ and $K^+Al(OC(CF_3)_3)_4^-$.

E12. A battery according to any of embodiments 1-9 where the one or more ionic compounds are selected from the group consisting ionic liquids.

E13. A battery according to embodiment 1 where the one or more ionic compounds are selected from the group consisting of zwitterions.

E14. A battery according to embodiment 1 where the one or more ionic compounds are selected from the group consisting of ethylammonium nitrate, diethylmethylammonium trifluoromethanesulfonate (DEMA TfO), triethylammonium methanesulfonate, 2-methylpyridinium trifluoromethanesulfonate, ammonium fluoride, methylammonium nitrate, hydroxyethylammonium nitrate, ethylammonium nitrate, dimethylammonium nitrate, 1-methylimidazolium chloride, 1-methylimidazolium nitrate, 1-ethylimidazolium nitrate, t-butylammonium tetrafluoroborate, hydroxyethylammonium tetrafluoroborate, methylbutylammonium tetrafluoroborate, triethylammonium tetrafluoroborate, imidazolium tetrafluoroborate, 1-methylimidazolium hydrogensulfate, 1-methylimidazolium tetrafluoroborate, 1,2-dimethylimidazolium tetrafluoroborate, t-butylammonium triflate, 2-fluoropyridinium triflate, hydroxyethylammonium triflate, 1,2-dimethylimidazolium triflate, imidazolium triflate, 1-methylimidazolium triflate, hydronium triflate, methylammonium mesylate, ethylammonium mesylate, butylammonium mesylate, methoxyethylammonium mesylate, dimethylammonium mesylate, dibutylammonium mesylate, triethylammonium mesylate, dimethylethylammonium mesylate, hydronium hydrogensulfate, ammonium hydrogensulfate, methylammonium hydrogensulfate, ethylammonium hydrogensulfate, propylammonium hydrogensulfate, n-butylammonium hydrogensulfate, t-butylammonium hydrogensulfate, dimethylammonium hydrogensulfate, diethylammonium hydrogensulfate, di-n-butylammonium hydrogensulfate, methylbutylammonium hydrogensulfate, ethylbutylammonium hydrogensulfate, trimethylammonium hydrogensulfate, triethylammonium hydrogensulfate, tributylammonium hydrogensulfate, dimethylethylammonium hydrogensulfate, dibutylammonium fluorohydrogen phosphate, triethylammonium fluorohydrogen phosphate, tributylammonium fluorohydrogen phosphate, hydronium dihydrogen phosphate, methylammonium dihydrogen phosphate, ethylammonium dihydrogen phosphate, propylammonium dihydrogen phosphate, n-butylammonum dihydrogen phosphate, methoxyethylammonium dihydrogen phosphate, dimethylammonium dihydrogen phosphate, dibutylammonium dihydrogen phosphate, methylbutylammonium dihydrogen phosphate, ammonium bifluoride, methylammonium bifluoride, ethylammonium bifluoride and dimethylammonium bifluoride.

E15. A battery according to embodiment 1 where the one or more ionic compounds are selected from the group consisting of tri-n-butylmethylammonium methylsulfate, 1-ethyl-2,3-dimethylimidazolium ethylsulfate, 1-butyl-3-methylimidazolium thiocyanate, 1-butyl-3-methylimidazolium tetrachloroaluminate, 1-butyl-3-methylimidazolium methylsulfate, 1-butyl-3-methylimidazolium methanesulfonate, 1-butyl-3-methylimidazolium hydrogensulfate, 1-butyl-3-methylimidazolium hydrogencarbonate, 1-butyl-3-methylimidazolium chloride, 1,2,3-trimethylimidazolium methylsulfate, 1,2,4-trimethylpyrazolium methylsulfate, 1-ethyl-3-methylimidazolium chloride, 1-ethyl-3-methylimidazolium thiocyanate, 1-ethyl-3-methylimidazolium methanesulfonate, 1-ethyl-3-methylimidazolium tetrachloroaluminate, 1-ethyl-3-methylimidazolium hydrogensulfate, 1-ethyl-3-methylimidazolium ethylsulfate, 1-ethyl-3-methylimidazolium nitrate, 1-butylpyridinium chloride, 1-ethyl-3-methylimidazolium dicyanamide, 1-ethyl-3-methylimidazolium tetrafluoroborate, 1,3-dimethylimidazolium hydrogencarbonate, 1-ethyl-3-methylimidazolium hydrogencarbonate, 1-ethyl-3-methylimidazolium hexafluorophosphate, 1-butyl-3,5-dimethylpyridinium bromide, 1-ethyl-3-methylimidazolium bis(trifluoromethylsulfonyl)imide, 1-ethyl-3-methylimidazolium bis(pentafluoroethylsulfonyl)imide, 1-ethyl-2,3-dimethylimidazolium methylcarbonate, carboxymethyl-tributylphosphonium bis(trifluoromethylsulfonyl)imide, N-carboxyethyl-methylpyrrolidinium bis(trifluoromethylsulfonyl)imide, N-carboxymethyl-trimethylammonium bis(trifluoromethylsulfonyl)imide, N-carboxymethyl-methylpyridinium bis(trifluoromethylsulfonyl)imide, hexyltrimethylammonium bis(trifluromethylsulfonyl)imide, tetrabutylphosphonium methanesulfonate, tetrabutylphosphonium tetrafluoroborate, tetrabutylphosphonium p-toluenesulfonate, 1-ethyl-3-methylimidazolium hydrogencarbonate, triethylmethylammonium methylcarbonate, tributylmethylammonium methylcarbonate, 1-ethyl-1-methylpiperidinium methylcarbonate, 4-ethyl-4-methylmorpholinium methylcarbonate, 1-butyl-1-methylpyrrolidinium methylcarbonate, triethylmethylammonium dibutylphosphate, tributylmethylammonium dibutylphosphate, 1-ethyl-3-methylimidazolium dibutylphosphate, 1-butyl-3-methylimidazolium dibutylphosphate, 1-(cyanomethyl)-3-methylimidazolium chloride, 1-(3-cyanopropyl)-3-methylimidazolium chloride, 1-(3-cyanopropyl)-3-methylimidazolium bis(trifluoromethylsulfonyl)imide, 1-(3-cyanopropyl)-3-methylimidazolium dicyanamide, 1-(3-cyanopropyl) pyridinium chloride, 1-(3-cyanopropyl)pyridinium bis(trifluoromethylsulfonyl)imide, 1,3-bis (cyanomethyl)imidazolium chloride, 1,3-bis(cyanomethyl)imidazoliumbis(trifluoromethylsulfonyl)imide, 1,3-bis (3-cyanopropyl)imidazolium chloride, 1,3-bis(3-cyanopropyl) imidazolium bis(trifluoromethylsulfonyl)imide, 1-butyl-3-methylimidazolium hexafluorophosphate, 1-butyl-3-methylimidazolium tetrafluoroborate, 1-ethyl-3-methylimidazolium tetrafluoroborate, 1-ethyl-3-methylimidazolium chloride, 1-ethyl-3-methylimidazolium bromide, 1-butyl-3-methylimidazolium bromide, 1-hexyl-3-methylimidazolium choride, tributylmethylphosphonium dibutylphosphate, triethylmethylphosphonium dibutylphosphate, tributylmethylphosphonium methylcarbonate, tributylmethylphosphonium methylsulfate, triethylmethylphosphonium dibutylphosphate, trihexyltetradecylphosphonium bis(trifluromethylsulfonyl)imide, trihexyltetradecylphosphonium bis(2,4,4-trimethylphenyl) phosphinate, trihexyltetradecylphosphonium bromide, trihexyltetradecylphosphonium chloride, trihexyltetradecylphosphonium decanoate, trihexyltetradecylphosphonium dicyanamide, 3-(triphenylphosphonio)propane-1-sulfonate and 3-(triphenylphosphonio) propane-1-sulfonic acid tosylate.

E16. A battery according to embodiment 1 where the electrolyte composition comprises at least two different ionic compounds.

E17. A battery according to embodiment 16 where the electrolyte composition comprises a protic ionic compound and an aprotic ionic compound.

E18. A battery according to embodiment 16 where the electrolyte composition comprises two different protic ionic compounds.

E19. A battery according to embodiment 16 where the electrolyte composition comprises two different aprotic ionic compounds.

E20. A battery according to any of embodiments 16-19 where the electrolyte composition comprises two different salts.

E21. A battery according to any of embodiments 16-19 where the electrolyte composition comprises two different ionic liquids.

E22. A battery according to any of embodiments 16-19 where the electrolyte composition comprises a salt and an ionic liquid, for example a protic or aprotic ammonium salt or an alkali metal salt such as an alkai metal halide.

E23. A battery according to any of embodiments 16-18, 21 and 22 where the electrolyte composition comprises a protic acid, protic ammonium compound or a protic oxonium compound and an ionic liquid.

E24. A battery according to any of embodiments 16-23 where the electrolyte composition comprises two different ionic compounds which contain an identical cation or an identical anion.

E25. A battery according to any of embodiments 16-24 where the weight:weight ratio of the two different ionic compounds is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E26. A battery according to any of the preceding embodiments where the electrolyte composition contains no organic solvent and ≤1000 ppm, ≤100 ppm or ≤10 ppm water by weight, based on the total weight of the electrolyte composition.

E27. A battery according to any of embodiments 1-25 where the electrolyte composition comprises a solvent.

E28. A battery according to embodiment 27 where the solvent consists essentially of water.

E29. A battery according to embodiment 27 where the solvent consists essentially of organic solvent.

E30. A battery according to embodiment 27 where the solvent comprises water and an organic solvent.

E31. A battery according to embodiment 30 where the weight:weight ratio of water to organic solvent is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E32. A battery according to any of embodiments 29-31 where the organic solvent comprises one or more solvents selected from the group consisting of organic carbonates, ethers, glymes, ortho esters, polyalklene glycols, esters, lactones, glycols, formates, sulfones, sulfoxides, amides, alcohols, amines, ketones, nitro solvents and nitrile solvents.

E33. A battery according to embodiment 32 where the organic solvent comprises one or more solvents selected from the group consisting of ethylene carbonate (EC), propylene carbonate (PC), trimethylene carbonate, 1,2-butylene carbonate (BC), dimethyl carbonate (DMC), diethyl carbonate (DEC), ethylmethyl carbonate (EMC), vinylene carbonate, difluoroethylene carbonate, mono-fluoroethylene carbonate, dimethoxymethane (DMM), diethoxymethane, 1,2-dimethoxyethane (DME or ethyl-eneglycol dimethylether or glyme), diglyme, triglyme, tetraglyme, ethyleneglycol diethylether (DEE), ethyl-eneglycol dibutylether, diethyleneglycol diethylether, tetrahydrofuran (THF), 2-methyltetrahydrofuran (2-MeTHF), 1,3-dioxane, 1,3-dioxolane (DIOX), 4-methyl-1,3-dioxolane (4-MeDIOX), 2-methyl-1,3-dioxolane (2-MeDIOX), 1,4-dioxane, dimethylether, ethylmethylether, diethylether, di-n-butylether, di-t-butylether, di-isopropylether, methyl-t-butylether, ethyl-t-butylether, t-amyl-methylether, trimethoxymethane, triethoxymethane, 1,4-dimethyl-3,5,8-trioxabicyclo[2.2.2]octane, 4-ethyl-1-methyl-3,5,8-trioxabicyclo[2.2.2]octane, polyethylene glycol, dimethylpolyethylene glycol, diethylpolyethylene glycol, γ-butyrolactone (GBL), γ-valerolactone, δ-valerolactone, ethyl acetate (EA), 2-methoxyethyl acetate, 2-ethoxyethyl acetate, 2-butoxyethyl acetate, 2-(2-butoxyethoxy)ethyl acetate (diethylene glycol butyl ether acetate, DBA), ethylene glycol diacetate (EGDA), 3-ethoxy ethyl propionate (EEP), methyl butyrate (MB), n-amyl acetate (NAAC), propylene glycol methyl ether acetate (PMA), ethyl butyrate (EB), diethyl malonate, dimethyl malonate, dibasic ester mixture (DBE), ethylene glycol, propylene glycol, 2-methoxyethanol, 2-ethoxyethanol, 2-propoxyethanol, 2-isopropoxyethanol, 2-butoxyethanol (ethylene glycol butyl ether, EB), 2-phenoxy-ethanol, 2-benzyloxyethanol, 2-(2-methoxyethoxy) ethanol, 2-(2-ethoxyethoxy)ethanol, 2-(2-butoxyethoxy) ethanol (diethylene glycol butyl ether, DB), propylene glycol butyl ether (PB), propylene glycol methyl ether (PM), triethylene glycol (TEG), dipropylene glycol methyl ether (DPM), diethylene glycol methyl ether, 1,3-butanediol, 1,4-butanediol, 1,5-pentanediol, perfluoro-1,4-butanediol, perfluoro-1,5-butanediol, fluorinated diethylene glycol methyl ether, fluorinated triethylene glycol, fluorinated triethylene glycol methyl ether and fluorinated diethylent glycol butyl ether, methyl formate, ethyl formate, isobutyl formate, tert-butyl formate, methylsulfonylmethane (MSM or dimethylsulfone), ethylmethylsulfone, sulfolane, dimethylsulfoxide (DMSO), dimethylformamide (DMF), N-methylpyrrolidone (NMP), 2-pyrrolidone, 1,3-dimethyl-2-imidazolidinone (DMI), hexamethylphosphoramide (HMPA), N,N'-dimethyl-N,N'-trimethyleneurea (1,3-dimethyl-3,4,5,6-tetrahydro-2 (1H)-pyrimidinone (DMPU)), benzylalcohol (BA), ethanol, trifluoroethanol (2,2,-trifluoroethanol), methanol, isopropanol, t-butanol, n-butanol, methylethylketone (MEK), methyl-isoamylketone (MIAK), triethylamine, tributylamine, diethylenetriamine, ethylenediamine, morpholine, piperidine, pyridine, nitrobenzene, nitromethane, nitroethane, acetonitrile, propionitrile, butyronitrile and adiponitrile.

E34. A battery according to any of embodiments 27-33 where the weight:weight ratio of ionic compounds in total to solvent is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E35. A battery according to any of the preceding embodiments where the electrolyte composition further comprises one or more additives selected from the group consisting of corrosion inhibitors, solid electrolyte interface (SEI) improvers, proton evolution improvers, self-discharge inhibitors, anti-gassing agents, viscosity adjusting agents, cathode protection agents, salt stabilizers, conductivity improvers and solvating agents.

E36. A metal hydride battery according to embodiment 1 where the electrolyte composition comprises one or more ionic compounds selected from the group consisting of alkali or alkali earth metal hydroxides and alkoxides and an organic solvent.

E37. A battery according to embodiment 36 where the one or more ionic compounds are selected from the group consisting of alkali metal hydroxides and alkali earth metal hydroxides.

E38. A battery according to embodiment 36 where the one or more ionic compounds are selected from the group consisting of alkali metal alkoxides and alkali earth metal alkoxides.

E39. A battery according to embodiment 36 where the one or more ionic compounds are selected from the group selected from sodium, potassium, calcium or magnesium hydroxide, and sodium, potassium, calcium or magnesium methoxide, ethoxide, n-propoxide, i-propoxide, n-butoxide, t-butoxide, 2-methylbutoxide or phenoxide.

E40. A battery according to embodiment 36 where the one or more ionic compounds are selected from the group consisting of sodium or potassium hydroxide and sodium or potassium methoxide, ethoxide, n-propoxide, i-propoxide, n-butoxide, t-butoxide, 2-methylbutoxide or phenoxide.

E41. A battery according to embodiment 36 where the one or more ionic compounds are selected from the group consisting of potassium hydroxide, potassium methoxide and potassium ethoxide.

E42. A battery according to embodiment 36 where the one or more ionic compounds are selected from the group consisting of sodium methoxide, sodium ethoxide, potassium methoxide and potassium ethoxide.

E43. A battery according to any of embodiments 36-42 where the organic solvent comprises one or more solvents selected from the group consisting of organic carbonates, ethers, glymes, ortho esters, polyalkylene glycols, glycols, alcohols, sulfones, sulfoxides, amides and nitrile solvents.

E44. A battery according to any of embodiments 36-42 where the organic solvent comprises one or more solvents selected from the group consisting of ethylene carbonate, propylene carbonate, trimethylene carbonate, 1,2-butylene carbonate, dimethyl carbonate, diethyl carbonate, ethylmethyl carbonate, dimethoxymethane, 1,2-dimethoxyethane, diglyme, triglyme, tetraglyme, ethyleneglycol diethylether, ethyleneglycol dibutylether, diethyleneglycol diethylether, tetrahydrofuran, 2-methyltetrahydrofuran, 1,3-dioxolane, 4-methyl-1,3-dioxolane, 2-methyl-1,3-dioxolane, 1,4-dioxane, diethylether, di-t-butylether, di-isopropylether, methyl-t-butylether, ethyl-t-butylether, t-amyl-methylether, 2-methoxyethanol, 2-ethoxyethanol, 2-propoxyethanol, 2-isopropoxyethanol, 2-butoxyethanol, 2-phenoxyethanol, 2-benzyloxyethanol, 2-(2-methoxyethoxy)ethanol, 2-(2-ethoxyethoxy)ethanol, 2-(2-butoxyethoxy)ethanol, trimethoxymethane, triethoxymethane, 1,4-dimethyl-3,5,8-trioxabicyclo[2.2.2]octane, 4-ethyl-1-methyl-3,5,8-trioxabicyclo[2.2.2]octane, polyethylene glycol, dimethylpolyethylene glycol, diethylpolyethylene glycol, propylene glycol butyl ether, propylene glycol methyl ether, triethylene glycol, dipropylene glycol methyl ether, diethylene glycol methyl ether, 1,3-butanediol, 1,4-butanediol, 1,5-pentanediol, perfluoro-1,4-butanediol, perfluoro-1,5-butanediol, fluorinated diethylene glycol methyl ether, fluorinated triethylene glycol, fluorinated triethylene glycol methyl ether and fluorinated diethylent glycol butyl ether, ethylene glycol, propylene glycol, benzylalcohol, ethanol, trifluoroethanol, methanol, isopropanol, t-butanol, n-butanol, acetonitrile, propionitrile, butyronitrile, methylsulfonylmethane, sulfolane, dimethylsulfoxide, dimethylformamide, N-methylpyrrolidone, 2-pyrrolidone, 1,3-dimethyl-2-imidazolidinone, hexamethylphosphoramide and N,N'-dimethyl-N,N'-trimethyleneurea.

E45. A battery according to any of embodiments 36-42 where the organic solvent comprises one or more solvents selected from the group consisting of consisting 2-methoxyethanol, 2-ethoxyethanol, 2-propoxyethanol, 2-isopropoxyethanol, 2-butoxyethanol, 2-phenoxyethanol, 2-benzyloxyethanol, 2-(2-methoxyethoxy)ethanol, 2-(2-ethoxyethoxy)ethanol, 2-(2-butoxyethoxy)ethanol, propylene glycol butyl ether, propylene glycol methyl ether, triethylene glycol, dipropylene glycol methyl ether, benzylalcohol, ethanol, trifluoroethanol, ethylene glycol, propylene gylcol, methanol, isopropanol, t-butanol and n-butanol.

E46. A battery according to embodiment 36 where the one or more ionic compounds are selected from the group consisting of KOH, NaOH, KOMe, NaOMe, KOEt and NaOEt and the solvent comprises one or more solvents selected from the group consisting of 2-methoxyethanol, 2-ethoxyethanol, 2-propoxyethanol, 2-isopropoxyethanol, 2-butoxyethanol, 2-phenoxyethanol, 2-benzyloxyethanol, 2-(2-methoxyethoxy)ethanol, 2-(2-ethoxyethoxy)ethanol, 2-(2-butoxyethoxy)ethanol, propylene glycol butyl ether, propylene glycol methyl ether, triethylene glycol, dipropylene glycol methyl ether, benzylalcohol, ethanol, trifluoroethanol, ethylene glycol, propylene gylcol, methanol, isopropanol, t-butanol and n-butanol.

E47. A battery according to any of embodiments 36-46 where the weight:weight ratio of ionic compounds in total to organic solvent is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E48. A battery according to any of embodiments 36-47 where the electrolyte composition contains ≤1000 ppm, ≤100 ppm or ≤10 ppm by weight water, based on the total weight of the electrolyte composition.

E49. A battery according to any of embodiments 36-48 where the electrolyte composition further comprises one or more additives selected from the group consisting of corrosion inhibitors, solid electrolyte interface (SEI) improvers, proton evolution improvers, self-discharge inhibitors, anti-gassing agents, viscosity adjusting agents, cathode protection agents, salt stabilizers, conductivity improvers and solvating agents.

E50. A battery according to embodiment 1 where the electrolyte composition comprises one or more ionic compounds selected from the group consisting of alkali metal hydroxides, water and one or more further components selected from the group consisting of organic solvents, further ionic compounds and additives.

E51. A battery according to embodiment 50 where the electrolyte composition comprises an organic solvent.

E52. A battery according to embodiment 51 where the organic solvent comprises one or more solvents selected from the group consisting of organic carbonates, ethers, glymes, ortho esters, polyalkylene glycols, glycols, alcohols, sulfones, sulfoxides, amides and nitrile solvents.

E53. A battery according to embodiment 51 where the organic solvent comprises one or more solvents selected from the group consisting of ethylene carbonate, propylene carbonate, trimethylene carbonate, 1,2-butylene carbonate, dimethyl carbonate, diethyl carbonate, ethylmethyl carbonate, dimethoxymethane, 1,2-dimethoxyethane, diglyme, triglyme, tetraglyme, ethyleneglycol diethylether, ethyleneglycol dibutylether, diethyleneglycol diethylether, tetrahydrofuran, 2-methyltetrahydrofuran, 1,3-dioxolane, 4-methyl-1,3-dioxolane, 2-methyl-1,3-dioxolane, 1,4-dioxane, diethylether, di-t-butylether, di-isopropylether, methyl-t-butylether, ethyl-t-butylether, t-amyl-methylether, 2-methoxyethanol, 2-ethoxyethanol, 2-propoxyethanol, 2-isopropoxyethanol, 2-butoxyethanol, 2-phenoxyethanol, 2-benzyloxyethanol, 2-(2-methoxyethoxy)ethanol, 2-(2-ethoxyethoxy)ethanol, 2-(2-butoxyethoxy)ethanol, trimethoxymethane, triethoxymethane, 1,4-dimethyl-3,5,8-trioxabicyclo[2.2.2]octane, 4-ethyl-1-methyl-3,5,8-trioxabicyclo[2.2.2]octane, polyethylene glycol, dimethylpolyethylene glycol, diethylpolyethylene glycol, propylene glycol butyl ether, propylene glycol methyl ether, triethylene glycol, dipropylene glycol methyl ether, diethylene glycol methyl ether, 1,3-butanediol, 1,4-butanediol, 1,5-pentanediol, perfluoro-1,4-butanediol, perfluoro-1,5-butanediol, fluorinated diethylene glycol methyl ether, fluorinated triethylene glycol, fluorinated triethylene glycol methyl ether and fluorinated diethylent glycol butyl ether, ethylene glycol, propylene glycol, benzylalcohol, ethanol, trifluoroethanol, methanol, isopropanol, t-butanol, n-butanol, acetonitrile, propionitrile, butyronitrile, methylsulfonylmethane, sulfolane, dimethylsulfoxide, dimethylformamide, N-methylpyrrolidone, 2-pyrrolidone, 1,3-dimethyl-2-imidazolidinone, hexamethylphosphoramide and N,N'-dimethyl-N,N'-trimethyleneurea.

E54. A battery according to embodiment 51 where the electrolyte composition comprises polyethylene glycol, dimethylpolyethylene glycol or diethylpolyethylene glycol.

E55. A battery according to any of embodiments 51-54 where the weight:weight ratio of water to organic solvent is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E56. A battery according to any of embodiments 51-55 where the weight:weight ratio of the alkali metal hydroxide to the organic solvent plus water is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E57. A battery according to any of embodiments 50-56 where the electrolyte composition comprises one or more further ionic compounds.

E58. A battery according to embodiment 57 where the electrolyte composition comprises KOH and one or more further ionic compounds selected from the group consisting of NaOH, LiOH, $Mg(OH)_2$ and $Ca(OH)_2$.

E59. A battery according to embodiment 57 where the further ionic compounds are selected from the group consisting of ionic liquids.

E60. A battery according to any of embodiments 57-59 where the weight:weight ratio of the alkali metal hydroxide to the further ionic compounds in total is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E61. A battery according to any of embodiments 50-60 where the electrolyte composition comprises one or more additives.

E62. A battery according to embodiment 61 where the electrolyte composition comprises one or more additives selected from the group consisting of corrosion inhibitors, solid electrolyte interface (SEI) improvers, proton evolution improvers, self-discharge inhibitors, anti-gassing agents, viscosity adjusting agents, cathode protection agents, salt stabilizers, conductivity improvers and solvating agents.

E63. A battery according to embodiment 1 where the electrolyte composition comprises one or more ionic compounds selected from the group consisting of carboxylate compounds and carboxylic acids.

E64. A battery according to embodiment 63 where the electrolyte composition comprises one or more carboxylate compounds.

E65. A battery according to embodiment 64 where the one or more carboxylate compounds are selected from the group consisting of alkali metal, alkali earth metal and ammonium carboxylates.

E66. A battery according to embodiment 64 where the one or more carboxylate compounds are selected from the group consisting of alkali metal and alkali earth metal carboxylates.

E67. A battery according to embodiment 64 where the one or more carboxylate compounds are selected from the group consisting of ammonium and phosphonium carboxylates.

E68. A battery according to embodiment 64 where the one or more carboxylate compounds contain a cation selected from the group consisting of $Na^+$, $K^+$, $Ca^{++}$, $Mg^{++}$, $NH_4^+$, methylammonium, ethylammonium, dimethylammonium, diethylammonium, trimethylammonium ($NMe_3H^+$), triethylammonium, tributylammonium, diethylmethylammonium, hydroxyethylammonium, methoxymethylammonium, dibutylammonium, methylbutylammonium, anilinium, pyridinium, 2-methylpyridinium, imidazolium, 1-methylimidazolium, 1,2-dimethylimidazolium, imidazolinium, quinolinium, isoquinolinium, pyrrolinium, pyrrolininium, pyrrolidinium, tetramethylammonium, tetraethylammonium, tetra-n-butylammonium, n-butyl-tri-ethylammonium, benzyl-tri-methylammonium, tri-n-butylmethylammonium, benzyl-tri-ethylammonium, 1-methylpyridinium, 1-butyl-3,5-dimethylpyridinium, 1,2,4-trimethylpyrazolium, trimethylhydroxyethylammonium (choline), dimethyldi(polyoxyethylene)ammonium, tri-(hydroxyethyl) methylammonium, 1,2,3-trimethylimidazolium, 1-butyl-3-methylimidazolium, 1-ethyl-2,3-dimethylimidazolium, 1,3-dimethylimidazolium, 1-ethyl-1-methylpiperidinium, 4-ethyl-4-methylmorpholinium, 1-(cyanomethyl)-3-methylimidazolium, 1-(3-cyanopropyl)pyridinium, 1,3-bis(cyanomethyl)imidazolium, 1-ethyl-3-methylimidazolium, methyltriphenylphosphonium, tetraphenylphosphonium, tetrabutylphosphonium, tributylmethylphosphonium, triethylmethylphosphonium, trihexyltetradecylphosphonium, triphenylpropylphosphonium and tetrakis(hydroxymethyl)phosphonium.

E69. A battery according to any of embodiments 64-68 where the one or more carboxylate compounds contain an anion selected from the group consisting of formate, acetate, fluoroacetate, difluoroacetate, trifluoroacetate, chloroacetate, dichloroacetate, trichloroacetate, propanoate, n-butanoate, i-butanoate, n-pentanoate, i-pentanoate, octanoate, decanoate, benzoate, salicylate, thiosalicylate, 2-, 3- or 4-nitrobenzoate; citrate, oxalate, tartrate, glycolate, gluconate, malate, mandelate, a carboxylate of nitrilotriacetic acid, a carboxylate of N-(2-hydroxyethyl)-ethylenediaminetriacetic acid, a carboxylate of ethylenediaminetetraacetic acid and a carboxylate of diethylenetriaminepentaacetic acid.

E70. A battery according to embodiment 64 where the one or more carboxylate compounds are selected from the group consisting of sodium, potassium, calcium and magnesium formate, ethanoate (acetate), propanoate, n-butanoate, i-butanoate, n-pentanoate or i-pentanoate.

E71. A battery according to embodiment 64 where the one or more carboxylate compounds are selected from the group consisting of sodium and potassium formate, ethanoate, propanoate, n-butanoate, i-butanoate, n-pentanoate or i-pentanoate.

E72. A battery according to embodiment 64 where the one or more carboxylate compounds are selected from the group consisting of tetramethylammonium benzoate, tetraethylammonium oxalate, tetrabutylammonium tartrate, sodium tartrate, potassium formate, tetramethylammonium acetate, 1-methylpyridinium chloride, trimethylammonium citrate tri-basic, tetramethylammonium 2-, 3- or 4-nitrobenzoate, ammonium benzoate, ammonium salicylate, ammonium oxalate, ammonium tartrate, methyltriphenyl phosphonium acetate, tetrakis(hydroxymethyl) phosphonium benzoate, tetrakis(hydroxymethyl) phosphonium formate, mono- or di-potassium tartrate, ammonium citrate mono-, di- or tri-basic; ammonium 2-nitrobenzoate, ammonium 3-nitrobenzoate, ammonium 4-nitrobenzoate, potassium trifluoroacetate and potassium chloroacetate.

E73. A battery according to any of embodiments 64-69 where the one more carboxylate compounds are selected from the group consisting of ionic liquids.

E74. A battery according to embodiment 64 where the one or more carboxylate compounds are selected from the group consisting of trihexyltetradecylphosphonium decanoate, 1-ethyl-3-methylimidazolium acetate, choline acetate, choline salicylate, 1-butyl-3-methylimidazolium acetate, 1-ethyl-3-methylimidazolium lactate, 2-hydroxyethyltrimethylammonium lactate, 2-hydroxyethyltrimethylammonium acetate and methyltrioctylammonium thiosalicylate.

E75. A battery according to embodiment 63 where the electrolyte composition comprises one or more carboxylic acids.

E76. A battery according to embodiment 75 where the one or more carboxylic acids are selected from the group consisting of formic acid, acetic acid, fluoroacetic acid, difluoroacetic acid, trifluoroacetic acid, chloroacetic acid, dichloroacetic acid, trichloroacetic acid, propanoic acid, butyric acid, 3-methylbutanoic acid, valeric acid, hexanoic acid, heptanoic acid, caprylic acid, nonanoic acid, benzoic acid, salicylic acid, 2-, 3- or 4-nitrobenzoic acid; citric acid, oxalic acid, tartaric acid, glycolic acid, gluconic acid, malic acid, mandelic acid, nitrilotriacetic acid, N-(2-hydroxyethyl)-ethylenediaminetriacetic acid, ethylenediaminetetraacetic acid and diethyleneaminepentaacetic acid.

E77. A battery according to embodiment 75 where the one or more carboxylic acids are selected from the group consisting of acetic acid, propanoic acid, butyric acid, 3-methylbutanoic acid, valeric acid, hexanoic acid, heptanoic acid, caprylic acid and nonanoic acid.

E78. A battery according to embodiment 63 where the electrolyte composition comprises at least two different ionic compounds as defined in any of embodiments 63-77.

E79. A battery according to embodiment 78 where the electrolyte composition comprises a protic ionic compound and an aprotic ionic compound.

E80. A battery according to embodiment 78 where the electrolyte composition comprises two different protic ionic compounds.

E81. A battery according to embodiment 78 where the electrolyte composition comprises two different aprotic ionic compounds.

E82. A battery according to any of embodiments 78-81 where the electrolyte composition comprises two different salts.

E83. A battery according to any of embodiments 78-81 where the electrolyte composition comprises two different ionic liquids.

E84. A battery according to any of embodiments 78-81 where the electrolyte composition comprises a salt and an ionic liquid.

E85. A battery according to any of embodiments 78-81 where the electrolyte composition comprises a carboxylate compound and a carboxylic acid.

E86. A battery according to any of embodiments 78-80, 83 and 85 where the electrolyte composition comprises a carboxylic acid and an ionic liquid.

E87. A battery according to any of embodiments 78-86 where the electrolyte composition comprises two different ionic compounds which contain an identical cation or an identical anion.

E88. A battery according to any of embodiments 78-87 where the weight:weight ratio of the two different ionic compounds is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E89. A battery according to any of embodiments 63-88 where the electrolyte composition contains no organic solvent and ≤1000 ppm, ≤100 ppm or ≤10 ppm water by weight, based on the total weight of the electrolyte composition.

E90. A battery according to any of embodiments 63-88 where the electrolyte composition comprises a solvent.

E91. A battery according to embodiment 90 where the solvent consists essentially of water.

E92. A battery according to embodiment 90 where the solvent consists essentially of an organic solvent.

E93. A battery according to embodiment 90 where the solvent comprises water and an organic solvent.

E94. A battery according to any of embodiments 92-93 where the organic solvent comprises one or more solvents selected from the group consisting of organic carbonates, ethers, glymes, ortho esters, polyalklene glycols, esters, lactones, glycols, formates, sulfones, sulfoxides, amides, alcohols, amines, ketones, nitro solvents and nitrile solvents.

E95. A battery according to embodiment 94 where the organic solvent comprises one or more solvents selected from the group consisting of ethylene carbonate (EC), propylene carbonate (PC), trimethylene carbonate, 1,2-butylene carbonate (BC), dimethyl carbonate (DMC), diethyl carbonate (DEC), ethylmethyl carbonate (EMC), vinylene carbonate, difluoroethylene carbonate, monofluoroethylene carbonate, dimethoxymethane (DMM), diethoxymethane, 1,2-dimethoxyethane (DME or ethyleneglycol dimethylether or glyme), diglyme, triglyme, tetraglyme, ethyleneglycol diethylether (DEE), ethyleneglycol dibutylether, diethyleneglycol diethylether, tetrahydrofuran (THF), 2-methyltetrahydrofuran (2-MeTHF), 1,3-dioxane, 1,3-dioxolane (DIOX), 4-methyl-1,3-dioxolane (4-MeDIOX), 2-methyl-1,3-dioxolane (2-MeDIOX), 1,4-dioxane, dimethylether, ethylmethylether, diethylether, di-n-butylether, di-t-butylether, di-isopropylether, methyl-t-butylether, ethyl-t-butylether, t-amyl-methylether, trimethoxymethane, triethoxymethane, 1,4-dimethyl-3,5,8-trioxabicyclo[2.2.2]octane, 4-ethyl-1-methyl-3,5,8-trioxabicyclo[2.2.2]octane, polyethylene glycol, dimethylpolyethylene glycol or diethylpolyethylene glycol, γ-butyrolactone (GBL), γ-valerolactone, δ-valerolactone, ethyl acetate (EA), 2-methoxyethyl acetate, 2-ethoxyethyl acetate, 2-butoxyethyl acetate, 2-(2-butoxyethoxy)ethyl acetate (diethylene glycol butyl ether acetate, DBA), ethylene glycol diacetate (EGDA), 3-ethoxy ethyl propionate (EEP), methyl butyrate (MB), n-amyl acetate (NAAC), propylene glycol methyl ether acetate (PMA), ethyl butryate (EB), diethyl malonate, dimethyl malonate, dibasic ester mixture (DBE), ethylene glycol, propylene glycol, 2-methoxyethanol, 2-ethoxyethanol, 2-propoxyethanol, 2-isopropoxyethanol, 2-butoxyethanol (ethylene glycol butyl ether, EB), 2-phenoxyethanol, 2-benzyloxyethanol, 2-(2-methoxyethoxy)ethanol, 2-(2-ethoxyethoxy)ethanol, 2-(2-butoxyethoxy)

ethanol (diethylene glycol butyl ether, DB), propylene glycol butyl ether (PB), propylene glycol methyl ether (PM), triethylene glycol (TEG), dipropylene glycol methyl ether (DPM), diethylene glycol methyl ether, 1,3-butanediol, 1,4-butanediol, 1,5-pentanediol, perfluoro-1,4-butanediol, perfluoro-1,5-butanediol, fluorinated diethylene glycol methyl ether, fluorinated triethylene glycol, fluorinated triethylene glycol methyl ether and fluorinated diethylent glycol butyl ether, methyl formate, ethyl formate, isobutyl formate, tert-butyl formate, methylsulfonylmethane (MSM or dimethylsulfone), ethylmethylsulfone, sulfolane, dimethylsulfoxide (DMSO), dimethylformamide (DMF), N-methylpyrrolidone (NMP), 2-pyrrolidone, 1,3-dimethyl-2-imidazolidinone (DMI), hexamethylphosphoramide (HMPA), N,N'-dimethyl-N,N'-trimethyleneurea (1,3-dimethyl-3,4,5,6-tetrahydro-2(1H)-pyrimidinone (DMPU)), benzylalcohol (BA), ethanol, trifluoroethanol (2,2,-trifluoroethanol), methanol, isopropanol, t-butanol, n-butanol, methylethylketone (MEK), methyl-isoamylketone (MIAK), triethylamine, tributylamine, diethylenetriamine, ethylenediamine, morpholine, piperidine, pyridine, nitrobenzene, nitromethane, nitroethane, acetonitrile, propionitrile, butyronitrile and adiponitrile.

E96. A battery according to any of embodiments 93-95 where the weight:weight ratio of water to organic solvent is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E97. A battery according to any of embodiments 90-96 where the weight:weight ratio of ionic compounds in total to solvent is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E98. A battery according to any of embodiments 63-97 where the electrolyte composition further comprises one or more additives selected from the group consisting of corrosion inhibitors, solid electrolyte interface (SEI) improvers, proton evolution improvers, self-discharge inhibitors, anti-gassing agents, viscosity adjusting agents, cathode protection agents, salt stabilizers, conductivity improvers and solvating agents.

E99. A battery according to any of the preceding embodiments where the electrolyte composition exhibits a viscosity of ≤100 cP, ≤90 cP, ≤80 cP, ≤70 cP, ≤50 cP, ≤40 cP, ≤30 cP, ≤20 cP, ≤10 cP or ≤5 cP at 25° C.

E100. A battery according to any of the preceding embodiments which exhibits a nominal open-circuit voltage of from about 1.2 to about 5.0 V, from about 1.3 to about 5.0 V, from about 1.4 to about 5.0 V or from about 1.5 to about 5.0 V.

E101. An electrolyte composition as defined in any of embodiments 1 to 99.

E102. A metal hydride battery comprising at least one negative electrode, at least one positive electrode, a casing having said electrodes positioned therein and an electrolyte composition, where the battery exhibits a nominal open-circuit voltage of from about 1.5 to about 5.0 V.

E103. A battery according to embodiment 102 where the electrolyte composition comprises one or more ionic compounds selected from the group consisting of alkali or alkali earth metal salts, protic acids, protic ammonium compounds, protic oxonium compounds, aprotic ammonium compounds, aprotic oxonium compounds and aprotic phosphonium compounds.

E104. A battery according to embodiment 103 where the one or more ionic compounds contain an anion selected from the group consisting of hydroxide, nitrate, perchlorate, bifluoride, alkoxides, halides, phosphates, phosphinates, phosphonates, borates, carboxylates, sulfites, sulfates, sulfonates, carbonates, imides, aluminates, cyanates, methides, arsenates, silicates and antimonates.

E105. A battery according to embodiment 103 where the one or more ionic compounds contain an anion selected from the group consisting of chloride, bromide, $H_2PO_4^-$, $BF_4^-$, dibutylphosphate, $HPO_3F^-$, hydrogensulfate, thiocyanate, bifluoride, perchlorate, dicyanamide, $Al(OC(CF_3)_3)_4^-$, $B(C_6F_5)_4^-$, $[N(SO_2CF_3)_2]^-$ (bistriflimide), bis(pentafluoroethylsulfonyl)imide, trifluoromethanesulfonate (triflate), p-toluenesulfonate (tosylate), methanesulfonate (mesylate), tetraphenylborate, $[B(3,5-(CF_3)_2C_6H_3)_4]^-$, $Al(OC(CF_3)_3)_4^-$, $B(C_6F_5)_4^-$, $[N(SO_2CF_3)_2]^-$, $N(SO_2F)_2^-$, tris(pentafluoroethyl)trifluorophosphate, $B(C_2O_4)_2^-$, difluoro(oxalato)borate, tetrachloroaluminate, tetrafluoroaluminate, tetraiodoaluminate, tetrabromoaluminate, $AsF_6^-$, $PF_6^-$, $SbF_6^-$ and $SiF_6^{-2}$.

E106. A battery according to any of embodiments 103-105 where the one or more ionic compounds are selected from the group consisting ionic liquids.

E107. A battery according to embodiment 103 where the one or more ionic compounds are selected from the group consisting of ethylammonium nitrate, diethylmethylammonium trifluoromethanesulfonate, triethylammonium methanesulfonate, 2-methylpyridinium trifluoromethanesulfonate, ammonium fluoride, methylammonium nitrate, hydroxyethylammonium nitrate, ethylammonium nitrate, dimethylammonium nitrate, 1-methylimidazolium chloride, 1-methylimidazolium nitrate, 1-ethylimidazolium nitrate, t-butylammonium tetrafluoroborate, hydroxyethylammonium tetrafluoroborate, methylbutylammonium tetrafluoroborate, triethylammonium tetrafluoroborate, imidazolium tetrafluoroborate, 1-methylimidazolium hydrogensulfate, 1-methylimidazolium tetrafluoroborate, 1,2-dimethylimidazolium tetrafluoroborate, t-butylammonium triflate, 2-fluoropyridinium triflate, hydroxyethylammonium triflate, 1,2-dimethylimidazolium triflate, imidazolium triflate, 1-methylimidazolium triflate, hydronium triflate, methylammonium mesylate, ethylammonium mesylate, butylammonium mesylate, methoxyethylammonium mesylate, dimethylammonium mesylate, dibutylammonium mesylate, triethylammonium mesylate, dimethylethylammonium mesylate, hydronium hydrogensulfate, ammonium hydrogensulfate, methylammonium hydrogensulfate, ethylammonium hydrogensulfate, propylammonium hydrogensulfate, n-butylammonium hydrogensulfate, t-butylammonium hydrogensulfate, dimethylammonium hydrogensulfate, diethylammonium hydrogensulfate, di-n-butylammonium hydrogensulfate, methylbutylammonium hydrogensulfate, ethylbutylammonium hydrogensulfate, trimethylammonium hydrogensulfate, triethylammonium hydrogensulfate, tributylammonium hydrogensulfate, dimethylethylammonium hydrogensulfate, dibutylammonium fluorohydrogen phosphate, triethylammonium fluorohydrogen phosphate, tributylammonium fluorohydrogen phosphate, hydronium dihydrogen phosphate, methylammonium dihydrogen phosphate, ethylammonium dihydrogen phosphate, propylammonium dihydrogen phosphate, n-butylammonum dihydrogen phosphate, methoxyethylammonium dihydrogen phosphate, dimethylammonium dihydrogen phosphate, dibutylammonium dihydrogen phosphate, methylbutylammonium dihydrogen phosphate, ammonium bifluoride, methylammonium bifluoride, ethylammonium bifluoride and dimethylammonium bifluoride.

E108. A battery according to embodiment 103 where the one or more ionic compounds are selected from the group consisting of tri-n-butylmethylammonium methylsulfate, 1-ethyl-2,3-dimethylimidazolium ethylsulfate, 1-butyl-3-methylimidazolium thiocyanate, 1-butyl-3-methylimidazolium tetrachloroaluminate, 1-butyl-3-methylimidazolium methylsulfate, 1-butyl-3-methylimidazolium methanesulfonate, 1-butyl-3-methylimidazolium hydrogensulfate, 1-butyl-3-methylimidazolium hydrogencarbonate, 1-butyl-3-methylimidazolium chloride, 1,2,3-trimethylimidazolium methylsulfate, 1,2,4-trimethylpyrazolium methylsulfate, 1-ethyl-3-methylimidazolium chloride, 1-ethyl-3-methylimidazolium thiocyanate, 1-ethyl-3-methylimidazolium methanesulfonate, 1-ethyl-3-methylimidazolium tetrachloroaluminate, 1-ethyl-3-methylimidazolium hydrogensulfate, 1-ethyl-3-methylimidazolium ethylsulfate, 1-ethyl-3-methylimidazolium nitrate, 1-butylpyridinium chloride, 1-ethyl-3-methylimidazolium dicyanamide, 1-ethyl-3-methylimidazolium tetrafluoroborate, 1,3-dimethylimidazolium hydrogencarbonate, 1-ethyl-3-methylimidazolium hydrogencarbonate, 1-ethyl-3-methylimidazolium hexafluorophosphate, 1-butyl-3,5-dimethylpyridinium bromide, 1-ethyl-3-methylimidazolium bis(trifluoromethylsulfonyl)imide, 1-ethyl-3-methylimidazolium bis(pentafluoroethylsulfonyl)imide, 1-ethyl-2,3-dimethylimidazolium methylcarbonate, carboxymethyl-tributylphosphonium bis(trifluoromethylsulfonyl)imide, N-carboxyethyl-methylpyrrolidinium bis(trifluoromethylsulfonyl)imide, N-carboxymethyl-trimethylammonium bis(trifluoromethylsulfonyl)imide, N-carboxymethyl-methylpyridinium bis(trifluoromethylsulfonyl)imide, hexyltrimethylammonium bis(trifluoromethylsulfonyl)imide, tetrabutylphosphonium methanesulfonate, tetrabutylphosphonium tetrafluoroborate, tetrabutylphosphonium p-toluenesulfonate, 1-ethyl-3-methylimidazolium hydrogencarbonate, triethylmethylammonium methylcarbonate, tributylmethylammonium methylcarbonate, 1-ethyl-1-methylpiperidinium methylcarbonate, 4-ethyl-4-methylmorpholinium methylcarbonate, 1-butyl-1-methylpyrrolidinium methylcarbonate, triethylmethylammonium dibutylphosphate, tributylmethylammonium dibutylphosphate, 1-ethyl-3-methylimidazolium dibutylphosphate, 1-butyl-3-methylimidazolium dibutylphosphate, 1-(cyanomethyl)-3-methylimidazolium chloride, 1-(3-cyanopropyl)-3-methylimidazolium chloride, 1-(3-cyanopropyl)-3-methylimidazolium bis(trifluoromethylsulfonyl)imide, 1-(3-cyanopropyl)-3-methylimidazolium dicyanamide, 1-(3-cyanopropyl) pyridinium chloride, 1-(3-cyanopropyl)pyridinium bis(trifluoromethylsulfonyl)imide, 1,3-bis(cyanomethyl)imidazolium chloride, 1,3-bis(cyanomethyl)imidazolium bis(trifluoromethylsulfonyl)imide, 1,3-bis(3-cyanopropyl)imidazolium chloride, 1,3-bis(3-cyanopropyl) imidazolium bis(trifluoromethylsulfonyl) imide, 1-butyl-3-methylimidazolium hexafluorophosphate, 1-butyl-3-methylimidazolium tetrafluoroborate, 1-ethyl-3-methylimidazolium tetrafluoroborate, 1-ethyl-3-methylimidazolium chloride, 1-ethyl-3-methylimidazolium bromide, 1-butyl-3-methylimidazolium bromide, 1-hexyl-3-methylimidazolium choride, tributylmethylphosphonium dibutylphosphate, triethylmethylphosphonium dibutylphosphate, tributylmethylphosphonium methylcarbonate, tributylmethylphosphonium methylsulfate, triethylmethylphosphonium dibutylphosphate, trihexyltetradecylphosphonium bis(trifluromethylsulfonyl) imide, trihexyltetradecylphosphonium bis(2,4,4-trimethylphenyl)phosphinate, trihexyltetradecylphosphonium bromide, trihexyltetradecylphosphonium chloride, trihexyltetradecylphosphonium decanoate, trihexyltetradecylphosphonium dicyanamide, 3-(triphenylphosphonio)propane-1-sulfonate and 3-(triphenylphosphonio) propane-1-sulfonic acid tosylate.

E109. A battery according to embodiment 103 where the electrolyte composition comprises at least two different ionic compounds.

E110. A battery according to embodiment 109 where the electrolyte composition comprises two different salts.

E111. A battery according to embodiment 109 where the electrolyte composition comprises two different ionic liquids.

E112. A battery according to embodiment 109 where the electrolyte composition comprises an ionic liquid and a salt.

E113. A battery according to embodiment 102 where the electrolyte composition comprises an ionic liquid and one or more salts selected from the group consisting of protic or aprotic ammonium salts and alkali metal salts.

E114. A battery according to embodiment 102 where the electrolyte composition comprises an ionic liquid and a protic acid, protic ammonium compound or a protic oxonium compound.

E115. A battery according to embodiment 102 where the electrolyte composition comprises two different ionic compounds which contain an identical cation or an identical anion.

E116. A battery according to embodiment 102 where the electrolyte composition contains no organic solvent and 1000 ppm water by weight, based on the total weight of the electrolyte composition.

E117. A battery according to any of embodiments 102-116 where the electrolyte composition comprises a solvent.

E118. A battery according to embodiment 117 where the solvent consists essentially of water.

E119. A battery according to embodiment 117 where the solvent consists essentially of organic solvent.

E120. A battery according to embodiment 117 where the solvent comprises water and an organic solvent.

E121. A battery according to embodiment 117 where the solvent comprises one or more organic solvents selected from the group consisting of organic carbonates, ethers, glymes, ortho esters, polyalklene glycols, esters, lactones, glycols, formates, sulfones, sulfoxides, amides, alcohols, amines, ketones, nitro solvents and nitrile solvents.

E122. A battery according to embodiment 117 where the solvent comprises one or more organic solvents selected from the group consisting of ethylene carbonate, propylene carbonate, trimethylene carbonate, 1,2-butylene carbonate, dimethyl carbonate, diethyl carbonate, ethylmethyl carbonate, vinylene carbonate, difluoroethylene carbonate, monofluoroethylene carbonate, dimethoxymethane, diethoxymethane, 1,2-dimethoxyethane, diglyme, triglyme, tetraglyme, ethyleneglycol diethylether, ethyleneglycol dibutylether, diethyleneglycol diethylether, tetrahydrofuran, 2-methyltetrahydrofuran, 1,3-dioxane, 1,3-dioxolane, 4-methyl-1,3-dioxolane, 2-methyl-1,3-dioxolane, 1,4-dioxane, dimethylether, ethylmethylether, diethylether, di-n-butylether, di-t-butylether, di-isopropylether, methyl-t-butylether, ethyl-t-butylether, t-amyl-methylether, trimethoxymethane, triethoxymethane, 1,4-dimethyl-3,5,8-trioxabicyclo[2.2.2]octane, 4-ethyl-1-methyl-3,5,8-trioxabicyclo[2.2.2]octane, polyethylene glycol, dimethylpolyethylene glycol, diethylpolyethylene glycol, γ-butyrolactone, γ-valerolactone, δ-valerolactone, ethyl acetate, 2-methoxyethyl acetate, 2-ethoxyethyl acetate, 2-butoxyethyl acetate, 2-(2-butoxyethoxy)ethyl acetate, ethylene glycol diacetate, 3-ethoxy ethyl propionate, methyl butyrate, n-amyl acetate, propylene glycol methyl ether acetate, ethyl butyrate, diethyl malonate, dimethyl malonate, dibasic ester mixture, ethylene glycol, propylene glycol, 2-methoxyethanol, 2-ethoxyethanol, 2-propoxyethanol, 2-isopropoxyethanol, 2-butoxyethanol, 2-phenoxyethanol, 2-benzyloxyethanol, 2-(2-methoxyethoxy)ethanol, 2-(2-ethoxyethoxy)ethanol, 2-(2-butoxyethoxy)ethanol, propylene glycol butyl ether, propylene glycol methyl ether, triethylene glycol, dipropylene glycol methyl ether, diethylene glycol methyl ether, 1,3-butanediol, 1,4-butanediol, 1,5-pentanediol, perfluoro-1,4-butanediol, perfluoro-1,5-butanediol, fluorinated diethylene glycol methyl ether, fluorinated triethylene glycol, fluorinated triethylene glycol methyl ether and fluorinated diethylent glycol butyl ether, methyl formate, ethyl formate, isobutyl formate, tert-butyl formate, methylsulfonylmethane, ethylmethylsulfone, sulfolane, dimethylsulfoxide, dimethylformamide, N-methylpyrrolidone, 2-pyrrolidone, 1,3-dimethyl-2-imidazolidinone, hexamethylphosphoramide, N,N'-dimethyl-N,N'-trimethyleneurea (1,3-dimethyl-3,4,5,6-tetrahydro-2(1H)-pyrimidinone), benzylalcohol, ethanol, trifluoroethanol (2,2,-trifluoroethanol), methanol, isopropanol, t-butanol, n-butanol, methylethylketone, methyl-isoamylketone, triethylamine, tributylamine, diethylenetriamine, ethylenediamine, morpholine, piperidine, pyridine, nitrobenzene, nitromethane, nitroethane, acetonitrile, propionitrile, butyronitrile and adiponitrile.

E125. A battery according to embodiment 102 where the electrolyte composition comprises one or more ionic compounds selected from the group consisting of alkali or alkali earth metal hydroxides and alkoxides and an organic solvent.

E126. A battery according to embodiment 102 where the electrolyte composition comprises one or more ionic compounds selected from the group consisting of alkali metal hydroxides, water and one or more further components selected from the group consisting of organic solvents, further ionic compounds and additives.

E127. A battery according to embodiment 126 where the electrolyte composition comprises an organic solvent.

E128. A battery according to embodiment 126 where the electrolyte composition comprises one or more further ionic compounds.

E129. A battery according to embodiment 128 where the one or more further ionic compounds are selected from the group consisting of ionic liquids.

E130. A battery according to embodiment 126 where the electrolyte composition comprises one or more additives.

E131. A battery according to embodiment 102 where the electrolyte composition comprises one or more ionic compounds selected from the group consisting of carboxylate compounds and carboxylic acids.

E132. A battery according to embodiment 102 where the electrolyte composition comprises one or more ionic compounds selected from the group consisting of carboxylate compounds.

E133. A battery according to embodiment 132 where the one or more carboxylate compounds are selected from the group consisting of alkali metal, alkali earth metal and ammonium carboxylates.

E134. A battery according to embodiment 102 where the electrolyte composition comprises one or more ionic compounds selected from the group consisting of carboxylic acids.

E135. A battery according to embodiment 131 where the electrolyte composition comprises a carboxylate compound and a carboxylic acid.

E136. A battery according to embodiment 131 where the electrolyte composition comprises a solvent.

E137. A battery according to embodiment 136 where the solvent consists essentially of water.

E138. A battery according to embodiment 136 where the solvent consists essentially of an organic solvent.

E139. A battery according to embodiment 136 where the solvent comprises water and an organic solvent.

E140. A battery according to any of the preceding embodiments where the half cell charge/discharge electrochemical reaction at the anode upon application of an electrical potential across the cell is

$M + H^+ + e^- \rightleftharpoons MH.$

E141. A battery according to any of the preceding embodiments where the pH of the electrolyte composition is less than or equal to about 7.

E142. A metal hydride battery comprising at least one negative electrode, at least one positive electrode, a casing having said electrodes positioned therein and an electrolyte composition, where the half cell charge/discharge electrochemical reaction at the anode upon application of an electrical potential across the cell is

$M + H^+ + e^- \rightleftharpoons MH.$

E143. A metal hydride battery comprising at least one negative electrode, at least one positive electrode, a casing having said electrodes positioned therein and an electrolyte composition, where the electrolyte composition has a pH of less than or equal to about 7.

E144. A battery according to embodiments 142 or 143 where the electrolyte composition comprises one or more ionic compounds selected from the group consisting of alkali or alkali earth metal salts, protic acids, protic ammonium compounds, protic oxonium compounds, aprotic ammonium compounds, aprotic oxonium compounds and aprotic phosphonium compounds.

E145. A battery according to embodiment 144 where the one or more ionic compounds contain an anion selected from the group consisting of hydroxide, nitrate, perchlorate, bifluoride, alkoxides, halides, phosphates, phosphinates, phosphonates, borates, carboxylates, sulfites, sulfates, sulfonates, carbonates, imides, aluminates, cyanates, methides, arsenates, silicates and antimonates.

E146. A battery according to embodiment 144 where the one or more ionic compounds contain an anion selected from the group consisting of chloride, bromide, $H_2PO_4^-$, $BF_4^-$, dibutylphosphate, $HPO_3F^-$, hydrogensulfate, thiocyanate, bifluoride, perchlorate, dicyanamide, $Al(OC(CF_3)_3)_4^-$, $B(C_6F_5)_4^-$, $[N(SO_2CF_3)_2]^-$ (bistriflimide), bis(pentafluoroethylsulfonyl)imide, trifluoromethanesulfonate (triflate), p-toluenesulfonate (tosylate), methanesulfonate (mesylate), tetraphenylborate, $[B(3,5-(CF_3)_2C_6H_3)_4]^-$, $Al(OC(CF_3)_3)_4^-$, $B(C_6F_5)_4^-$, $[N(SO_2CF_3)_2]^-$, $N(SO_2F)_2^-$, tris(pentafluoroethyl)trifluorophosphate, $B(C_2O_4)_2^-$, difluoro(oxalato)borate, tetrachloroaluminate, tetrafluoroaluminate, tetraiodoaluminate, tetrabromoaluminate, $AsF_6^-$, $PF_6^-$, $SbF_6^-$ and $SiF_6^{-2}$.

E147. A battery according to any of embodiments 144-146 where the one or more ionic compounds are selected from the group consisting ionic liquids.

E148. A battery according to embodiment 144 where the one or more ionic compounds are selected from the group consisting of ethylammonium nitrate, diethylmethylammonium trifluoromethanesulfonate, triethylammonium methanesulfonate, 2-methylpyridinium trifluoromethanesulfonate, ammonium fluoride, methylammonium nitrate, hydroxyethylammonium nitrate, ethylammonium nitrate, dimethylammonium nitrate, 1-methylimidazolium chloride, 1-methylimidazolium nitrate, 1-ethylimidazolium nitrate, t-butylammonium tetrafluoroborate, hydroxyethylammonium tetrafluoroborate, methylbutylammonium tetrafluoroborate, triethylammonium tetrafluoroborate, imidazolium tetrafluoroborate, 1-methylimidazolium hydrogensulfate, 1-methylimidazolium tetrafluoroborate, 1,2-dimethylimidazolium tetrafluoroborate, t-butylammonium triflate, 2-fluoropyridinium triflate, hydroxyethylammonium triflate, 1,2-dimethylimidazolium triflate, imidazolium triflate, 1-methylimidazolium triflate, hydronium triflate, methylammonium mesylate, ethylammonium mesylate, butylammonium mesylate, methoxyethylammonium mesylate, dimethylammonium mesylate, dibutylammonium mesylate, triethylammonium mesylate, dimethylethylammonium mesylate, hydronium hydrogensulfate, ammonium hydrogensulfate, methylammonium hydrogensulfate, ethylammonium hydrogensulfate, propylammonium hydrogensulfate, n-butylammonium hydrogensulfate, t-butylammonium hydrogensulfate, dimethylammonium hydrogensulfate, diethylammonium hydrogensulfate, di-n-butylammonium hydrogensulfate, methylbutylammonium hydrogensulfate, ethylbutylammonium hydrogensulfate, trimethylammonium hydrogensulfate, triethylammonium hydrogensulfate, tributylammonium hydrogensulfate, dimethylethylammonium hydrogensulfate, dibutylammonium fluorohydrogen phosphate, triethylammonium fluorohydrogen phosphate, tributylammonium fluorohydrogen phosphate, hydronium dihydrogen phosphate, methylammonium dihydrogen phosphate, ethylammonium dihydrogen phosphate, propylammonium dihydrogen phosphate, n-butylammonum dihydrogen phosphate, methoxyethylammonium dihydrogen phosphate, dimethylammonium dihydrogen phosphate, dibutylammonium dihydrogen phosphate, methylbutylammonium dihydrogen phosphate, ammonium bifluoride, methylammonium bifluoride, ethylammonium bifluoride and dimethylammonium bifluoride.

E149. A battery according to embodiment 144 where the one or more ionic compounds are selected from the group consisting of tri-n-butylmethylammonium methylsulfate, 1-ethyl-2,3-dimethylimidazolium ethylsulfate, 1-butyl-3-methylimidazolium thiocyanate, 1-butyl-3-methylimidazolium tetrachloroaluminate, 1-butyl-3-methylimidazolium methylsulfate, 1-butyl-3-methylimidazolium methanesulfonate, 1-butyl-3-methylimidazolium hydrogensulfate, 1-butyl-3-methylimidazolium chloride, 1,2,3-trimethylimidazolium methylsulfate, 1,2,4-trimethylpyrazolium methylsulfate, 1-ethyl-3-methylimidazolium chloride, 1-ethyl-3-methylimidazolium thiocyanate, 1-ethyl-3-methylimidazolium methanesulfonate, 1-ethyl-3-methylimidazolium tetrachloroaluminate, 1-ethyl-3-methylimidazolium hydrogensulfate, 1-ethyl-3-methylimidazolium ethylsulfate, 1-ethyl-3-methylimidazolium nitrate, 1-butylpyridinium chloride, 1-ethyl-3-methylimidazolium dicyanamide, 1-ethyl-3-methylimidazolium tetrafluoroborate, 1,3-dimethylimidazolium hydrogencarbonate, 1-ethyl-3-methylimidazolium hydrogencarbonate, 1-ethyl-3-methylimidazolium hexafluorophosphate, 1-butyl-3,5-dimethylpyridinium bromide, 1-ethyl-3-methylimidazolium bis(trifluoromethylsulfonyl)imide, 1-ethyl-3-methylimidazolium bis(pentafluoroethylsulfonyl)imide, 1-ethyl-2,3-dimethylimidazolium methylcarbonate, carboxymethyltributylphosphonium bis(trifluoromethylsulfonyl)imide, N-carboxyethyl-methylpyrrolidinium bis(trifluoromethylsulfonyl)imide, N-carboxymethyl-trimethylammonium bis(trifluoromethylsulfonyl)imide, N-carboxymethyl-methylpyridinium bis(trifluoromethylsulfonyl)imide, hexyltrimethylammonium bis(trifluromethylsulfonyl)imide, tetrabutylphosphonium methanesulfonate, tetrabutylphosphonium tetrafluoroborate, tetrabutylphosphonium p-toluenesulfonate, 1-ethyl-3-methylimidazolium hydrogencarbonate, triethylmethylammonium methylcarbonate, tributylmethylammonium methylcarbonate, 1-ethyl-1-methylpiperidinium methylcarbonate, 4-ethyl-4-methylmorpholinium methylcarbonate, 1-butyl-1-methylpyrrolidinium methylcarbonate, triethylmethylammonium dibutylphosphate, tributylmethylammonium dibutylphosphate, 1-ethyl-3-methylimidazolium dibutylphosphate, 1-butyl-3-methylimidazolium dibutylphosphate, 1-(cyanomethyl)-3-methylimidazolium chloride, 1-(3-cyanopropyl)-3-methylimidazolium chloride, 1-(3-cyanopropyl)-3-methylimidazolium bis(trifluoromethylsulfonyl)imide, 1-(3-cyanopropyl)-3-methylimidazolium dicyanamide, 1-(3-cyanopropyl) pyridinium chloride, 1-(3-cyanopropyl)pyridinium bis(trifluoromethylsulfonyl)imide, 1,3-bis(cyanomethyl)imidazolium chloride, 1,3-bis(cyanomethyl)imidazolium bis(trifluoromethylsulfonyl)imide, 1,3-bis(3-cyanopropyl)imidazolium chloride, 1,3-bis(3-cyanopropyl)imidazolium bis(trifluoromethylsulfonyl) imide, 1-butyl-3-methylimidazolium hexafluorophosphate, 1-butyl-3-methylimidazolium tetrafluoroborate, 1-ethyl-3-methylimidazolium tetrafluoroborate, 1-ethyl-3-methylimidazolium chloride, 1-ethyl-3-methylimidazolium bromide, 1-butyl-3-methylimidazolium bromide, 1-hexyl-3-methylimidazolium choride, tributylmethylphosphonium dibutylphosphate, triethylmethylphosphonium dibutylphosphate, tributylmethylphosphonium methylcarbonate, tributylmethylphosphonium methylsulfate, triethylmethylphosphonium dibutylphosphate, trihexyltetradecylphosphonium bis(trifluromethylsulfonyl) imide, trihexyltetradecylphosphonium bis(2,4,4-trimethylphenyl)phosphinate, trihexyltetradecylphosphonium bromide, trihexyltetradecylphosphonium chloride, trihexyltetradecylphosphonium decanoate, trihexyltetradecylphosphonium dicyanamide, 3-(triphenylphosphonio)propane-1-sulfonate and 3-(triphenylphosphonio) propane-1-sulfonic acid tosylate.

E150. A battery according to embodiment 144 where the electrolyte composition comprises one or more ionic compounds selected from the group consisting of carboxylate compounds and carboxylic acids.

E151. A battery according to embodiment 144 where the electrolyte composition comprises one or more ionic compounds selected from the group consisting of carboxylate compounds.

E152. A battery according to embodiment 151 where the one or more carboxylate compounds are selected from the group consisting of alkali metal, alkali earth metal and ammonium carboxylates.

E153. A battery according to embodiment 144 where the electrolyte composition comprises one or more ionic compounds selected from the group consisting of carboxylic acids.

E154. A battery according to embodiment 150 where the electrolyte composition comprises a carboxylate compound and a carboxylic acid.

E155. A battery according to any of embodiments 144-154 where the electrolyte composition comprises at least two different ionic compounds.

E156. A battery according to embodiment 155 where the electrolyte composition comprises two different salts.

E157. A battery according to embodiment 155 where the electrolyte composition comprises two different ionic liquids.

E158. A battery according to embodiment 155 where the electrolyte composition comprises an ionic liquid and a salt.

E159. A battery according to embodiment 144 where the electrolyte composition comprises an ionic liquid and one or more salts selected from the group consisting of protic or aprotic ammonium salts and alkali metal salts.

E160. A battery according to embodiment 144 where the electrolyte composition comprises an ionic liquid and a protic acid, protic ammonium compound or a protic oxonium compound.

E161. A battery according to embodiment 144 where the electrolyte composition comprises two different ionic compounds which contain an identical cation or an identical anion.

E162. A battery according to embodiment 144 where the electrolyte composition contains no organic solvent and ≤1000 ppm water by weight, based on the total weight of the electrolyte composition.

E163. A battery according to embodiment 144 where the electrolyte composition comprises a solvent.

E164. A battery according to embodiment 163 where the solvent consists essentially of water.

E165. A battery according to embodiment 163 where the solvent consists essentially of organic solvent.

E166. A battery according to embodiment 163 where the solvent comprises water and an organic solvent.

E167. A battery according to embodiment 163 where the solvent comprises one or more organic solvents selected from the group consisting of organic carbonates, ethers, glymes, ortho esters, polyalklene glycols, esters, lactones, glycols, formates, sulfones, sulfoxides, amides, alcohols, amines, ketones, nitro solvents and nitrile solvents.

E168. A battery according to embodiment 163 where the solvent comprises one or more organic solvents selected from the group consisting of ethylene carbonate, propylene carbonate, trimethylene carbonate, 1,2-butylene carbonate, dimethyl carbonate, diethyl carbonate, ethylmethyl carbonate, vinylene carbonate, difluoroethylene carbonate, monofluoroethylene carbonate, dimethoxymethane, diethoxymethane, 1,2-dimethoxyethane, diglyme, triglyme, tetraglyme, ethyleneglycol diethylether, ethyleneglycol dibutylether, diethyleneglycol diethylether, tetrahydrofuran, 2-methyltetrahydrofuran, 1,3-dioxane, 1,3-dioxolane, 4-methyl-1,3-dioxolane, 2-methyl-1,3-dioxolane, 1,4-dioxane, dimethylether, ethylmethylether, diethylether, di-n-butylether, di-t-butylether, di-isopropylether, methyl-t-butylether, ethyl-t-butylether, t-amyl-methylether, trimethoxymethane, triethoxymethane, 1,4-dimethyl-3,5,8-trioxabicyclo[2.2.2]octane, 4-ethyl-1-methyl-3,5,8-trioxabicyclo[2.2.2]octane, polyethylene glycol, dimethylpolyethylene glycol, diethylpolyethylene glycol, γ-butyrolactone, γ-valerolactone, δ-valerolactone, ethyl acetate, 2-methoxyethyl acetate, 2-ethoxyethyl acetate, 2-butoxyethyl acetate, 2-(2-butoxyethoxy)ethyl acetate, ethylene glycol diacetate, 3-ethoxy ethyl propionate, methyl butyrate, n-amyl acetate, propylene glycol methyl ether acetate, ethyl butryate, diethyl malonate, dimethyl malonate, dibasic ester mixture, ethylene glycol, propylene glycol, 2-methoxyethanol, 2-ethoxyethanol, 2-propoxyethanol, 2-isopropoxyethanol, 2-butoxyethanol, 2-phenoxyethanol, 2-benzyloxyethanol, 2-(2-methoxyethoxy)ethanol, 2-(2-ethoxyethoxy) ethanol, 2-(2-butoxyethoxy)ethanol, propylene glycol butyl ether, propylene glycol methyl ether, triethylene glycol, dipropylene glycol methyl ether, diethylene glycol methyl ether, 1,3-butanediol, 1,4-butanediol, 1,5-pentanediol, perfluoro-1,4-butanediol, perfluoro-1,5-butanediol, fluorinated diethylene glycol methyl ether, fluorinated triethylene glycol, fluorinated triethylene glycol methyl ether and fluorinated diethylent glycol butyl ether, methyl formate, ethyl formate, isobutyl formate, tert-butyl formate, methylsulfonylmethane, ethylmethylsulfone, sulfolane, dimethylsulfoxide, dimethylformamide, N-methylpyrrolidone, 2-pyrrolidone, 1,3-dimethyl-2-imidazolidinone, hexamethylphosphoramide, N,N'-dimethyl-N,N'-trimethyleneurea (1,3-dimethyl-3,4,5,6-tetrahydro-2(1H)-pyrimidinone), benzylalcohol, ethanol, trifluoroethanol (2,2,-trifluoroethanol), methanol, isopropanol, t-butanol, n-butanol, methylethylketone, methyl-isoamylketone, triethylamine, tributylamine, diethylenetriamine, ethylenediamine, morpholine, piperidine, pyridine, nitrobenzene, nitromethane, nitroethane, acetonitrile, propionitrile, butyronitrile and adiponitrile.

E169. A battery according to embodiment 144 where the electrolyte composition comprises one or more additives selected from the group consisting of corrosion inhibitors, solid electrolyte interface improvers, proton evolution improvers, self-discharge inhibitors, anti-gassing agents, viscosity adjusting agents, cathode protection agents, salt stabilizers, conductivity improvers and solvating agents.

E170. A battery according to any of embodiments 144-169 where the electrolyte composition exhibits a viscosity of ≤100 cP, ≤90 cP, ≤80 cP, ≤70 cP, ≤50 cP, ≤40 cP, ≤30 cP, ≤20 cP, ≤10 cP or ≤5 cP at 25° C.

E171. A battery according to any of embodiments 144-170 which exhibits a nominal open-circuit voltage of from about 1.2 to about 5.0 V, from about 1.3 to about 5.0 V, from about 1.4 to about 5.0 V or from about 1.5 to about 5.0 V.

EXAMPLE 1

A 1 mol/L electrolyte composition of $HN(Me)_3BF_4$ in propylene carbonate is prepared. The electrolyte composition is employed in a cell with a rare earth nickel based $AB_5$ hydrogen storage material as negative electrode, a pasted nickel hydroxide positive electrode and a polypropylene/polyethylene grafted nonwoven fabric separator.

Alternatively, NH$_4$BF$_4$ is replaced with H$_3$PO$_4$, NH$_4$CF$_3$SO$_3$, N$_2$H$_6$SO$_4$, HN(Me)$_3$Cl, NH$_4$H$_2$PO$_4$, KH$_2$PO$_4$ or pyridinium chloride.

Alternatively, propylene carbonate (PC) is replaced with ethylene carbonate (EC), ethylmethylcarbonate (EMC), DMF, DMSO, dimethylcarbonate (DMC), diethyl carbonate (DEC), 1,2-dimethoxyethane (DME), ethyl acetate (EA) or blends thereof such as EC/DMC, EC/DEC, EC/EMC, EC/DMC/DEC or EC/DMC/EA.

EXAMPLE 2

Example 1 is repeated, replacing the electrolyte composition with neat diethylmethylammonium trifluoromethanesulfonate, triethylammonium methanesulfonate or 2-methylpyridinium trifluoromethanesulfonate. Alternatively, an 80:20 weight:weight mixture of diethylmethylammonium trifluoromethanesulfonate, triethylammonium methanesulfonate or 2-methylpyridinium trifluoromethanesulfonate: glyme is employed.

EXAMPLE 3

The electrolyte composition is employed in a cell with a rare earth nickel based AB$_5$ hydrogen storage material as negative electrode, a pasted nickel hydroxide positive electrode and a polypropylene/polyethylene grafted nonwoven fabric separator. The electrolyte composition is neat 1-ethyl-3-methylimidazolium dicyanamide. Alternatively, 1-ethyl-3-methylimidazolium tetrafluoroborate is employed. Alternatively, an 80:20 weight:weight mixture of tetrabutylphosphonium methanesulfonate: glyme is employed.

EXAMPLE 4

The electrolyte composition is employed in a cell with a rare earth nickel based AB$_5$ hydrogen storage material as negative electrode, a pasted nickel hydroxide positive electrode and a polypropylene/polyethylene grafted nonwoven fabric separator. The electrolyte composition is 30% by weight potassium ethoxide in trifluoroethanol. Alternatively, a 30% by weight mixture of sodium methoxide in methanol, a 30% by weight mixture of potassium ethoxide in ethylene glycol or a 30% by weight mixture of potassium ethoxide in ethanol is employed.

EXAMPLE 5

The electrolyte composition is employed in a cell with a rare earth nickel based AB$_5$ hydrogen storage material as negative electrode, a pasted nickel hydroxide positive electrode and a polypropylene/polyethylene grafted nonwoven fabric separator. The electrolyte composition is 25% by weight potassium hydroxide in propylene carbonate.

EXAMPLE 6

The electrolyte composition is employed in a cell with a rare earth nickel based AB$_5$ hydrogen storage material as negative electrode, a pasted nickel hydroxide positive electrode and a polypropylene/polyethylene grafted nonwoven fabric separator. The electrolyte composition is 25% by weight KOH in a 1:1 weight mixture of water and polyethylene glycol (PEG 600). The example is repeated, replacing the electrolyte composition with a 30% by weight mixture of KOH in PEG 300.

EXAMPLE 7

The electrolyte composition is employed in a cell with a rare earth nickel based AB$_5$ hydrogen storage material as negative electrode, a pasted nickel hydroxide positive electrode and a polypropylene/ polyethylene grafted nonwoven fabric separator. The electrolyte composition is 30% by weight potassium acetate in acetic acid. Alternatively, the electrolyte composition is 30% by weight caprylic acid in glyme or is 30% by weight potassium acetate in glyme or 30% by weight sodium acetate in butyric acid.

EXAMPLE 8

A 1 mol/L electrolyte composition of triethylammonium 2-nitrobenzoate in propylene carbonate is prepared. The composition is employed in a cell as per Example 1.

EXAMPLE 9

A 6 mol/L electrolyte composition of 1-ethyl-3-methylimidazolium acetate in glacial acetic acid is prepared. The composition is employed in a cell as per Example 1.

EXAMPLE 10

Electrolyte mixtures of diethylmethylammonium trifluoromethanesulfonate (DEMA TfO, ionic liquid) and trimethylammonium chloride (salt) are prepared. The ionic liquid:salt mixtures are prepared at weight:weight levels of 1:5, 1:4, 1:3, 1:2, 1:1, 2:1, 3:1, 4:1 and 5:1. Alternatively, the salt tetraethylammonium bromide or diethylmethylammonium chloride is employed in the mixtures as the salt. Alternatively, a sodium or potassium salt is employed as the salt, e.g. NaCl or KCl. Alternatively, a carboxylate salt is employed as the salt. The mixtures are employed in a cell as per Example 1.

EXAMPLE 11

Electrolyte mixtures of diethylmethylammonium trifluoromethanesulfonate (DEMA TfO, ionic liquid) and ethylammonium nitrate are prepared. The ionic liquid mixtures are prepared at weight:weight levels of 1:5, 1:4, 1:3, 1:2, 1:1, 2:1, 3:1, 4:1 and 5:1. The mixtures are employed in a cell as in Example 1. Alternatively, the ionic liquids are replaced with one or more of triethylammonium methanesulfonate, 2-methylpyridinium trifluoromethanesulfonate, tri-n-butylmethylammonium methylsulfate, 1-ethyl-2,3-dimethylimidazolium ethylsulfate or 1-butyl-3-methylimidazolium thiocyanate.

The invention claimed is:

1. A metal hydride battery comprising at least one negative electrode, at least one positive electrode, a casing having said electrodes positioned therein and an electrolyte composition,
   wherein the negative electrode comprises an AB$_x$ type alloy capable of storing hydrogen wherein x is from about 0.5 to about 5, A represents a hydride forming element and B represents a weak or non-hydride forming element,
   wherein the electrolyte composition is liquid at 25° C. and comprises one or more organic solvents selected from the group consisting of organic carbonates, ethers, glymes, ortho esters, polyalkylene glycols, esters, lactones, glycols, formates, sulfones, sulfoxides, amides, alcohols, amines, ketones, nitro solvents and nitrile solvents;

comprises one or more ionic liquid compounds selected from the group consisting of, protic acids, protic ammonium compounds, protic oxonium compounds, aprotic ammonium compounds, aprotic oxonium compounds and aprotic phosphonium compounds; and comprises≤1000 ppm water by weight, based on the total weight of the electrolyte composition, and wherein the battery exhibits a nominal open-circuit voltage of from about 1.5 to about 5.0 V.

2. A battery according to claim 1, wherein the organic solvents are selected from the group consisting of organic carbonates, glymes, glycols and alcohols.

3. A battery according to claim 1, wherein the one or more ionic liquid compounds are selected from the group consisting of ethylammonium nitrate, diethylmethylammonium trifluoromethanesulfonate, triethylammonium methanesulfonate, 2-methylpyridinium trifluoromethanesulfonate, ammonium fluoride, methylammonium nitrate, hydroxyethylammonium nitrate, ethylammonium nitrate, dimethylammonium nitrate, 1-methylimidazolium chloride, 1-methyl-imidazolium nitrate, 1-ethylimidazolium nitrate, t-butylammonium tetrafluoroborate, hydroxyethylammonium tetrafluoroborate, methylbutylammonium tetrafluoroborate, triethylammonium tetrafluoroborate, imidazolium tetrafluoroborate, 1-methylimidazolium hydrogensulfate, 1-methylimidazolium tetrafluoroborate, 1,2-dimethylimidazolium tetrafluoroborate, t-butylammonium triflate, 2-fluoropyridinium triflate, hydroxyethylammonium triflate, 1,2-dimethylimidazolium triflate, imidazolium triflate, 1-methylimidazolium triflate, hydronium triflate, methylammonium mesylate, ethylammonium mesylate, butylammonium mesylate, methoxyethylammonium mesylate, dimethylammonium mesylate, dibutylammonium mesylate, triethylammonium mesylate, dimethylethylammonium mesylate, hydronium hydrogensulfate, ammonium hydrogensulfate, methylammonium hydrogensulfate, ethylammonium hydrogensulfate, propylammonium hydrogensulfate, n-butylammonium hydrogensulfate, t-butylammonium hydrogensulfate, dimethylammonium hydrogensulfate, diethylammonium hydrogensulfate, di-n-butylammonium hydrogensulfate, methylbutylammonium hydrogensulfate, ethylbutylammonium hydrogensulfate, trimethylammonium hydrogensulfate, triethylammonium hydrogensulfate, tributylammonium hydrogensulfate, dimethylethylammonium hydrogensulfate, dibutylammonium fluorohydrogen phosphate, triethylammonium fluorohydrogen phosphate, tributylammonium fluorohydrogen phosphate, hydronium dihydrogen phosphate, methylammonium dihydrogen phosphate, ethylammonium dihydrogen phosphate, propylammonium dihydrogen phosphate, n-butylammonum dihydrogen phosphate, methoxyethylammonium dihydrogen phosphate, dimethylammonium dihydrogen phosphate, dibutylammonium dihydrogen phosphate, methylbutylammonium dihydrogen phosphate, ammonium bifluoride, methylammonium bifluoride, ethylammonium bifluoride and dimethylammonium bifluoride.

4. A battery according to claim 1, wherein the one or more liquid ionic compounds are selected from the group consisting of tri-n-butylmethylammonium methylsulfate, 1-ethyl-2,3-dimethylimidazolium ethylsulfate, 1-butyl-3-methylimidazolium thiocyanate, 1-butyl-3-methylimidazolium tetrachloroaluminate, 1-butyl-3-methylimidazolium methylsulfate, 1-butyl-3-methylimidazolium methanesulfonate, 1-butyl-3-methylimidazolium hydrogensulfate, 1-butyl-3-methylimidazolium hydrogencarbonate, 1-butyl-3-methylimidazolium chloride, 1,2,3-trimethylimidazolium methylsulfate, 1,2,4-trimethylpyrazolium methylsulfate, 1-ethyl-3-methylimidazolium chloride, 1-ethyl-3-methyl-imidazolium thiocyanate, 1-ethyl-3-methylimidazolium methanesulfonate, 1-ethyl-3-methylimidazolium tetrachloroaluminate, 1-ethyl-3-methylimidazolium hydrogensulfate, 1-ethyl-3-methylimidazolium ethylsulfate, 1-ethyl-3-methylimidazolium nitrate, 1-butylpyridinium chloride, 1-ethyl-3-methylimidazolium dicyanamide, 1-ethyl-3-methylimidazolium tetrafluoroborate, 1,3-dimethylimidazolium hydrogencarbonate, 1-ethyl-3-methylimidazolium hydrogencarbonate, 1-ethyl-3-methylimidazolium hexafluorophosphate, 1-butyl-3,5-dimethylpyridinium bromide, 1-ethyl-3-methylimidazolium bis(trifluoromethylsulfonyl)imide, 1-ethyl-3-methylimidazolium bis(pentafluoroethylsulfonyl)imide, 1-ethyl-2,3-dimethylimidazolium methylcarbonate, carboxymethyl-tributylphosphonium bis(trifluoromethylsulfonyl)imide, N-carboxyethyl-methylpyrrolidinium bis(trifluoromethylsulfonyl)imide, N-carboxymethyl-trimethylammonium bis(trifluoromethylsulfonyl)imide, N-carboxymethyl-methylpyridinium bis(trifluoromethylsulfonyl)imide, hexyltrimethylammonium bis(trifluromethylsulfonyl)imide, tetrabutylphosphonium methanesulfonate, tetrabutylphosphonium tetrafluoroborate, tetrabutylphosphonium p-toluenesulfonate, 1-ethyl-3-methylimidazolium hydrogencarbonate, triethylmethylammonium methylcarbonate, tributylmethylammonium methylcarbonate, 1-ethyl-1-methylpiperidinium methylcarbonate, 4-ethyl-4-methylmorpholinium methylcarbonate, 1-butyl-1-methylpyrrolidinium methylcarbonate, triethylmethylammonium dibutylphosphate, tributylmethylammonium dibutylphosphate, 1-ethyl-3-methylimidazolium dibutylphosphate, 1-butyl-3-methylimidazolium dibutylphosphate, 1-(cyanomethyl)-3-methylimidazolium chloride, 1-(3-cyanopropyl)-3-methylimidazolium chloride, 1-(3-cyanopropyl)-3-methylimidazolium bis(trifluoromethylsulfonyl)imide, 1-(3-cyanopropyl)-3-methylimidazolium dicyanamide, 1-(3-cyanopropyl)pyridinium chloride, 1-(3-cyanopropyl)pyridinium bis(trifluoromethylsulfonyl)imide, 1,3-bis(cyanomethyl)imidazolium chloride, 1,3-bis(cyanomethyl)imidazolium bis(trifluoromethylsulfonyl)imide, 1,3-bis(3-cyanopropyl)imidazolium chloride, 1,3-bis(3-cyanopropyl)imidazolium bis(trifluoromethylsulfonyl)imide, 1-butyl-3-methylimidazolium hexafluorophosphate, 1-butyl-3-methylimidazolium tetrafluoroborate, 1-ethyl-3-methylimidazolium tetrafluoroborate, 1-ethyl-3-methylimidazolium bromide, 1-butyl-3-methylimidazolium bromide, 1-hexyl-3-methylimidazolium choride, tributylmethylphosphonium dibutylphosphate, triethylmethylphosphonium dibutylphosphate, tributylmethylphosphonium methylcarbonate, tributylmethylphosphonium methylsulfate, triethylmethylphosphonium dibutylphosphate, trihexyltetradecylphosphonium bis(trifluromethylsulfonyl)imide, trihexyltetradecylphosphonium bis(2,4,4-trimethylphenyl)phosphinate, trihexyltetradecylphosphonium bromide, trihexyltetradecylphosphonium chloride, trihexyltetradecylphosphonium decanoate, trihexyltetradecylphosphonium dicyanamide, 3-(triphenylphosphonio)propane-1-sulfonate and 3-(triphenylphosphonio)propane-1-sulfonic acid tosylate.

5. A battery according to claim 1, wherein the electrolyte composition comprises two different ionic compounds which contain an identical cation or an identical anion.

6. A battery according to claim 1, wherein the electrolyte composition comprises one or more organic solvents selected from the group consisting of organic carbonates, ethers, glymes, ortho esters, polyalkylene glycols, esters, lactones and glycols.

7. A battery according to claim 1, wherein the positive electrode comprises a nickel hydroxide active material.

8. A battery according to claim 7, wherein the positive electrode comprises an active material selected from the group consisting of nickel hydroxide and modified nickel hydroxide.

9. A battery according to claim 1, wherein the electrolyte composition comprises one or more ionic liquid compounds selected from the group consisting of aprotic oxonium compounds.

10. A battery according to claim 1, wherein the organic solvents are selected from the group consisting of ethylene carbonate, propylene carbonate, trimethylene carbonate, 1,2-butylene carbonate, dimethyl carbonate, diethyl carbonate, ethylmethyl carbonate, vinylene carbonate, difluoroethylene carbonate, monofluoroethylene carbonate, dimethoxymethane, diethoxymethane, 1,2-dimethoxyethane, diglyme, triglyme, tetraglyme, ethyleneglycol diethylether, ethyleneglycol dibutylether, diethyleneglycol diethylether, tetrahydrofuran, 2-methyltetrahydrofuran, 1,3-dioxane, 1,3-dioxolane, 4-methyl-1,3-dioxolane, 2-methyl-1,3-dioxolane, 1,4-dioxane, dimethylether, ethylmethylether, diethylether, di-n-butylether, di-t-butylether, di-isopropylether, methyl-t-butylether, ethyl-t-butylether, t-amyl-methylether, trimethoxymethane, triethoxymethane, 1,4-dimethyl-3,5,8-trioxabicyclo[2.2.2]octane, 4-ethyl-1-methyl-3,5,8-trioxabicyclo[2.2.2]octane, polyethylene glycol, dimethylpolyethylene glycol, diethylpolyethylene glycol, γ-butyrolactone, γ-valerolactone, δ-valerolactone, ethyl acetate, 2-methoxyethyl acetate, 2-ethoxyethyl acetate, 2-butoxyethyl acetate, 2-(2-butoxyethoxy)ethyl acetate, ethylene glycol diacetate, 3-ethoxy ethyl propionate, methyl butyrate, n-amyl acetate, propylene glycol methyl ether acetate, ethyl butryate, diethyl malonate, dimethyl malonate, dibasic ester mixture, ethylene glycol, propylene glycol, 2-methoxyethanol, 2-ethoxyethanol, 2-propoxyethanol, 2-isopropoxyethanol, 2-butoxyethanol, 2-phenoxyethanol, 2-benzyloxyethanol, 2-(2-methoxyethoxy)ethanol, 2-(2-ethoxyethoxy)ethanol, 2-(2-butoxyethoxy)ethanol, propylene glycol butyl ether, propylene glycol methyl ether, triethylene glycol, dipropylene glycol methyl ether, diethylene glycol methyl ether, 1,3-butanediol, 1,4-butanediol, 1,5-pentanediol, perfluoro-1,4-butanediol, perfluoro-1,5-butanediol, fluorinated diethylene glycol methyl ether, fluorinated triethylene glycol, fluorinated triethylene glycol methyl ether and fluorinated diethylene glycol butyl ether, methyl formate, ethyl formate, isobutyl formate, tert-butyl formate, methylsulfonylmethane, ethylmethylsulfone, sulfolane, dimethylsulfoxide, dimethylformamide, N-methylpyrrolidone, 2-pyrrolidone, 1,3-dimethyl-2-imidazolidinone, hexamethylphosphoramide, N,N'-dimethyl-N,N'-trimethyleneurea (1,3-dimethyl-3,4,5, 6-tetrahydro-2(1H)-pyrimidinone), benzylalcohol, ethanol, trifluoroethanol (2,2,-trifluoroethanol), methanol, isopropanol, t-butanol, n-butanol, methylethylketone, methyl-isoamylketone, triethylamine, tributylamine, diethylenetriamine, ethylenediamine, morpholine, piperidine, pyridine, nitrobenzene, nitromethane, nitroethane, acetonitrile, propionitrile, butyronitrile and adiponitrile.

11. A battery according to claim 1, wherein the electrolyte composition comprises one or more additives selected from the group consisting of corrosion inhibitors, solid electrolyte interface improvers, proton evolution improvers, self-discharge inhibitors, anti-gassing agents, viscosity adjusting agents, cathode protection agents, salt stabilizers, conductivity improvers and solvating agents.

12. A battery according to claim 1, wherein the electrolyte composition exhibits a viscosity of ≤100 cP at 25° C.

13. A battery according to claim 1, wherein the electrolyte composition further comprises one or more additives.

14. A battery according to claim 1, wherein the protic acids are carboxylic acids.

15. A battery according to claim 1, wherein the electrolyte composition exhibits a viscosity of from about 0.2 cP to about 100 cP at 25° C.

16. A battery according to claim 1, wherein the electrolyte composition exhibits a viscosity of ≤90 cP at 25° C.

17. A battery according to claim 1, wherein the electrolyte composition is in contact with each of the at least one negative and at the least one positive electrodes.

18. A battery according to claim 1, wherein the hydride forming element is selected from a group consisting of Hf, Ti, Nd, Gd, Ce and La.

19. A battery according to claim 1, wherein the weak or non-hydride forming element is selected from a group consisting of Ni, Fe, Zr and Co.

20. A metal hydride battery comprising at least one negative electrode, at least one positive electrode, a casing having said electrodes positioned therein and an electrolyte composition,
wherein the negative electrode comprises an $AB_x$ type alloy capable of storing hydrogen wherein x is from about 0.5 to about 5, A represents a hydride forming element and B represents a weak or non-hydride forming element,
wherein the electrolyte composition is liquid at 25° C. and comprises one or more organic solvents selected from the group consisting of organic carbonates, ethers, glymes, ortho esters, polyalkylene glycols, esters, lactones, glycols, formates, sulfones, sulfoxides, amides, alcohols, amines, ketones, nitro solvents and nitrile solvents:
comprises two different ionic liquids selected from the group consisting of protic acids, protic ammonium compounds, protic oxonium compounds, aprotic ammonium compounds, aprotic oxonium compounds and aprotic phosphonium compounds; and
comprises ≤1000 ppm water by weight, based on the total weight of the electrolyte composition, and
wherein the battery exhibits a nominal open-circuit voltage of from about 1.5 to about 5.0 V.

21. A metal hydride battery comprising at least one negative electrode, at least one positive electrode, a casing having said electrodes positioned therein and an electrolyte composition,
wherein the negative electrode comprises an $AB_x$ type alloy capable of storing hydrogen wherein x is from about 0.5 to about 5, A represents a hydride forming element and B represents a weak or non-hydride forming element,
wherein the electrolyte composition is liquid at 25° C. and comprises one or more organic solvents selected from the group consisting of organic carbonates, ethers, glymes, ortho esters, polyalkylene glycols, esters, lactones, glycols, formates, sulfones, sulfoxides, amides, alcohols, amines, ketones, nitro solvents and nitrile solvents;
comprises one or more ionic compounds selected from the group consisting of aprotic ammonium compounds, aprotic oxonium compounds and aprotic phosphonium compounds; and comprises ≤1000 ppm water by weight, based on the total weight of the electrolyte composition, and wherein the battery exhibits a nominal open-circuit voltage of from about 1.5 to about 5.0 V.

* * * * *